(12) United States Patent
Schneider et al.

(10) Patent No.: US 12,166,529 B2
(45) Date of Patent: Dec. 10, 2024

(54) CURVED LIGHT GUIDE STRUCTURE, METHOD OF MANUFACTURING SAME, AND OPTICAL TRANSMISSION SYSTEM

(71) Applicant: Fraunhofer-Gesellschaft zur Förderung der angewandten Forschung e.V., Munich (DE)

(72) Inventors: Tobias Schneider, Dresden (DE); René Kirrbach, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 470 days.

(21) Appl. No.: 17/477,881

(22) Filed: Sep. 17, 2021

(65) Prior Publication Data
US 2022/0006528 A1   Jan. 6, 2022

Related U.S. Application Data

(63) Continuation of application No. PCT/EP2020/057445, filed on Mar. 18, 2020.

(30) Foreign Application Priority Data

Mar. 22, 2019  (DE) .......................... 102019203968.5
Jun. 19, 2019  (DE) .......................... 102019208982.8

(51) Int. Cl.
*G02B 6/42*  (2006.01)
*G02B 6/36*  (2006.01)
(Continued)

(52) U.S. Cl.
CPC ........... *H04B 10/25* (2013.01); *G02B 6/3604* (2013.01); *G02B 6/4214* (2013.01);
(Continued)

(58) Field of Classification Search
CPC ........ H04B 10/25; H04B 10/50; H04B 10/60; H04B 10/803; G02B 6/4214;
(Continued)

(56) References Cited

U.S. PATENT DOCUMENTS 4,109,997 A   8/1978  Iverson
4,109,998 A   8/1978  Iverson
(Continued)

FOREIGN PATENT DOCUMENTS

CN      107636502 A      1/2018
CN      108508544 A      9/2018
(Continued)

OTHER PUBLICATIONS

Chinese language office action dated Apr. 14, 2023, issued in application No. CN 202080035541.1.
(Continued)

*Primary Examiner* — Eric Wong
(74) *Attorney, Agent, or Firm* — McClure, Qualey & Rodack, LLP

(57) ABSTRACT

A curved light guide structure configured to guide a spectral region, includes: end faces disposed at two ends of the ring segment structure; a first main side extending between the end faces and a second main side opposite the first main side and extending between the end faces; at least a first pass region on the first main side, the first pass region being configured to receive and let pass an optical signal within the spectral region, the curved light guide structure being configured to guide the optical signal along an axial direction between the end faces; and at least a second pass region on the second main side that is configured to let pass and to emit at least part of the optical signal from the curved light guide structure.

24 Claims, 11 Drawing Sheets

(51) Int. Cl.
  *G02B 17/08* (2006.01)
  *H04B 10/25* (2013.01)
  *H04B 10/50* (2013.01)
  *H04B 10/60* (2013.01)

(52) U.S. Cl.
  CPC ......... *G02B 17/0868* (2013.01); *H04B 10/50* (2013.01); *H04B 10/60* (2013.01)

(58) Field of Classification Search
  CPC .. G02B 17/0868; G02B 6/102; G02B 6/2817; G02B 6/3604; G02B 6/10
  USPC .................................. 385/18, 32–33, 36, 37
  See application file for complete search history.

(56) References Cited

U.S. PATENT DOCUMENTS

| | | | |
|---|---|---|---|
| 4,259,584 A | 3/1981 | Krumme | |
| 4,576,436 A | 3/1986 | Daniel | |
| 4,711,516 A | 12/1987 | Graber | |
| 7,248,761 B2* | 7/2007 | Schilling | G02B 6/34 385/9 |
| 10,007,072 B1 | 6/2018 | Momtahan | |
| 2003/0156843 A1 | 8/2003 | Lohr et al. | |
| 2004/0062344 A1 | 4/2004 | Popescu et al. | |
| 2007/0065158 A1* | 3/2007 | Shindou | H04B 10/1143 398/164 |
| 2008/0170356 A1* | 7/2008 | Alameh | G06F 1/1681 361/600 |
| 2010/0202782 A1* | 8/2010 | Stark | G02B 6/3604 385/39 |
| 2011/0013868 A1 | 1/2011 | Suzumura et al. | |
| 2011/0026938 A1* | 2/2011 | Lo | G02B 7/24 398/202 |
| 2012/0057818 A1 | 3/2012 | Zeiger et al. | |
| 2012/0063484 A1* | 3/2012 | Goddard | G02B 6/124 264/293 |
| 2014/0341505 A1* | 11/2014 | Cottrell | G02B 6/3604 385/26 |
| 2018/0031393 A1 | 2/2018 | Okamoto | |
| 2021/0341676 A1* | 11/2021 | Svec | G02B 6/3604 |
| 2023/0408826 A1* | 12/2023 | Oh | G02F 1/1368 |

FOREIGN PATENT DOCUMENTS

| | | |
|---|---|---|
| DE | 28 46 526 A1 | 5/1980 |
| DE | 10 2007 041 927 A1 | 3/2009 |
| DE | 10 2017 217 110 A1 | 3/2019 |
| EP | 3 276 387 A1 | 1/2018 |
| JP | S57 138228 A | 8/1982 |
| WO | 2016/168305 A1 | 10/2016 |

OTHER PUBLICATIONS

English language translation of office action dated Apr. 14, 2023 (pp. 1-5 of attachment).
International Search Report and International Preliminary Examination report issued in PCT/EP2020/057445.

* cited by examiner

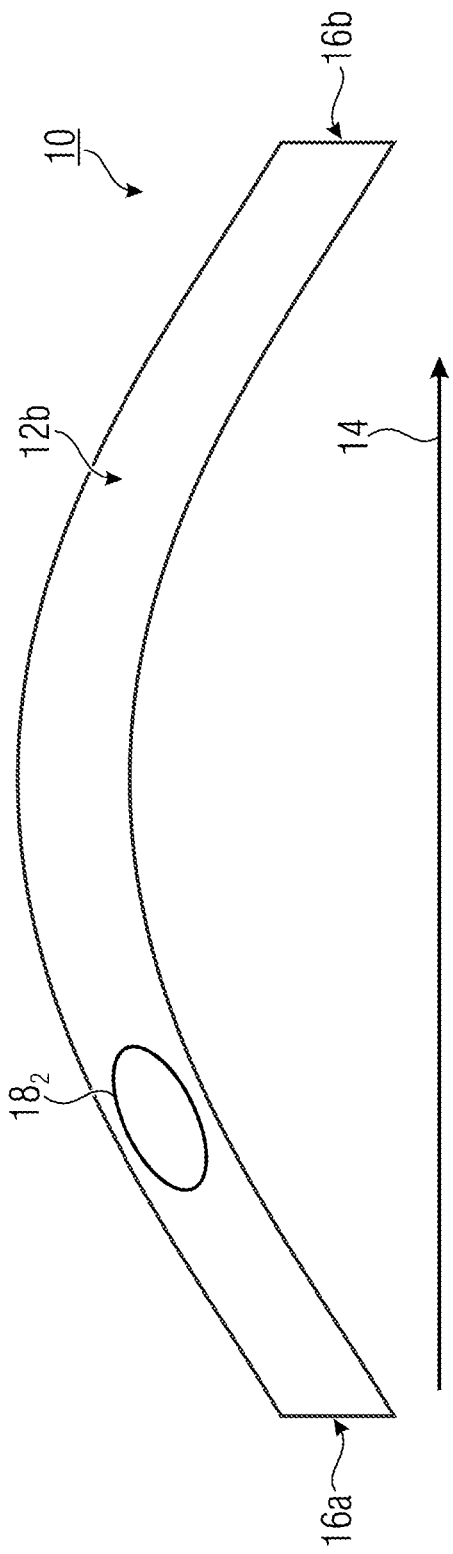 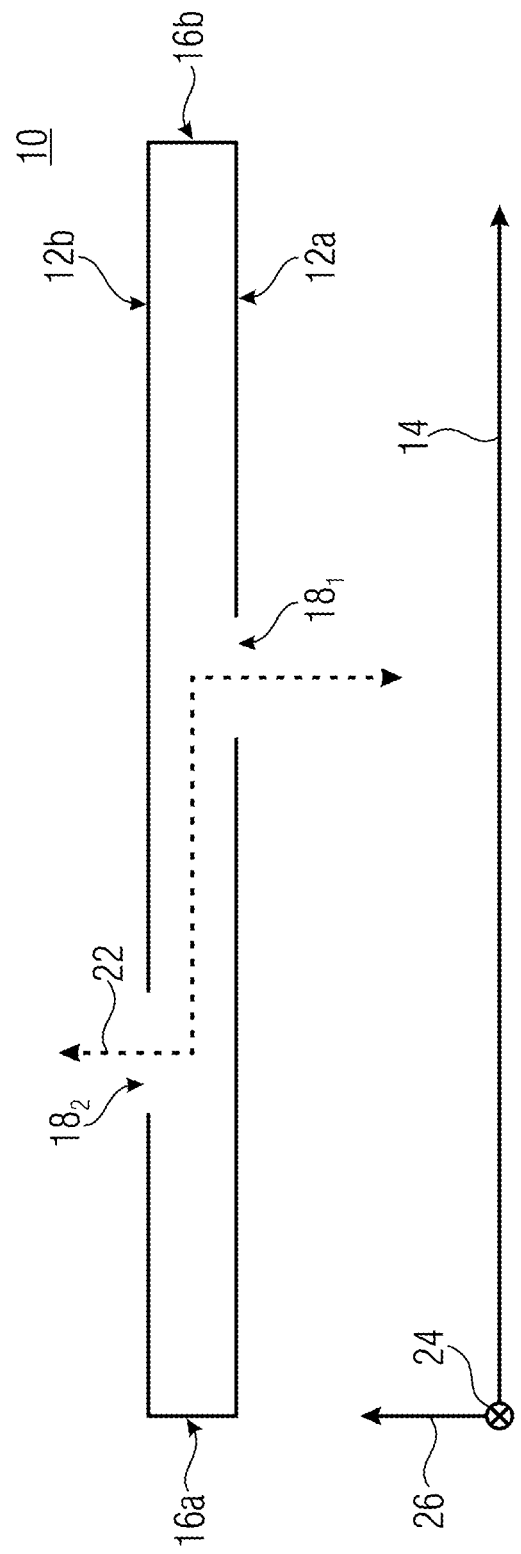

CURVED LIGHT GUIDE STRUCTURE, METHOD OF MANUFACTURING SAME, AND OPTICAL TRANSMISSION SYSTEM

CROSS-REFERENCES TO RELATED APPLICATIONS

This application is a continuation of copending International Application No. PCT/EP2020/057445, filed Mar. 18, 2020, which is incorporated herein by reference in its entirety, and additionally claims priority from German Applications Nos. DE 102019203968.5, filed Mar. 22, 2019, and DE 102019208982.8, filed Jun. 19, 2019, all of which are incorporated herein by reference in its entirety.

The present invention relates to a curved light guide structure, a method of manufacturing same, and an optical transmission system. The present invention further relates to an optical device for data transmission between two systems moving about an axis of rotation.

BACKGROUND OF THE INVENTION

Current industrial systems are based on data transmission by means of electrical cables. Slip rings and contact brushes are used at the rotation points. These systems have a limited service life due to the wear of the contacts.

Due to the one-sided signal propagation of the electrical signal on the slip ring, multipath propagation occurs. This leads to considerable differences in propagation time and limits the transmission bandwidth. Systems commonly available on the market allow data rates within the range of around 100 Mbit/s.

DE 10 2007 041 927 A1 also deals with this problem and aims to solve it by adapting optical waveguides, ideally single-mode fibers having a core diameter of 10 µm. The thin fibers are adapted in such a way that, in addition to coupling in and out at the front side, light may also be coupled in or out laterally. This approach is based on the wave character of light. Another much older publication, DE 28 46 526 A1, describes a basic device for optical data transmission in a computer tomograph. In such unspecific light guide structures and coupling structures, the light propagates more or less chaotically through the light guide. This limits the data rate within a range from 1 Mbit/s to 30 Mbit/s since this approach is based on classical beam optics.

It would be desirable to have a light guide structure that is set up to transmit optical signals between two objects moving relative to each other, and that allows both high data rates and long operating times.

SUMMARY

According to an embodiment, a curved light guide structure configured to guide an optical signal within a spectral region may have: end faces disposed at two ends of the curved light guide structure; a first main side extending between the end faces, and a second main side opposite the first main side and extending between the end faces; at least a first pass region on the first main side, the first pass region being configured to receive and transmit an optical signal within the spectral region, wherein the curved light guide structure is configured to guide the optical signal along an axial direction between the end faces; and at least a second pass region on the second main side that is configured to let pass, to form and emit at least part of the optical signal from the curved light guide structure; wherein the first pass region is configured to direct the optical signal to be emitted onto a first end face of the end faces, the second pass region being associated with a sub-region of the end face; and the part of the optical signal is based on a part of the optical signal that is redirected at the sub-region; wherein the first pass region is configured to direct the received optical signal to the first end face of the end faces, thereby performing focusing of the optical signal so that the optical signal redirected from the first end face is collimated.

According to another embodiment, a curved light guide structure configured to guide an optical signal within a spectral region may have: end faces disposed at two ends of the curved light guide structure; a first main side extending between the end faces, and a second main side opposite the first main side and extending between the end faces; at least a first pass region on the first main side, the first pass region being configured to receive and transmit an optical signal within the spectral region, wherein the curved light guide structure is configured to guide the optical signal along an axial direction between the end faces; and at least a second pass region on the second main side that is configured to let pass, to form and emit at least part of the optical signal from the curved light guide structure; wherein the first pass region is configured to direct the received optical signal to a reflection element configured to reflect the optical signal onto a sub-region of a first end face of the end faces that is associated with the reflection element; and the second pass region is configured to output the optical signal reflected by the end face; wherein the first pass region is configured to direct the received optical signal to the reflection element; wherein the arrangement of the first pass region and the reflection element is arranged to transmit the optical signal to the first end face in a collimated state.

According to yet another embodiment, an optical transmission system may have: an optical transmitter for transmitting an optical signal; an inventive curved light guide structure, configured to receive the optical signal at the first pass region; and an optical receiver for receiving at least part of the optical signal at the second pass region of the curved light guide structure.

A core idea of the present invention is to have recognized that by using optical signals in combination with beam shaping, an ordered light propagation path may be obtained which results in low interference and, thus, high transmission rates, while at the same time allowing low-wear operation due to the optical signal.

According to an embodiment, a curved light guide structure configured to guide an optical signal within a spectral region includes end faces disposed at two ends of the curved light guide structure and a first main side extending between the end faces and a second main side opposite the first main side and extending between the end faces. The curved light guide structure includes at least a first pass region on the first main side that is formed to receive and let pass an optical signal within the spectral region. The curved light guide structure is configured to guide the optical signal along an axial direction between the end faces, wherein the curved light guide structure comprises at least a second pass region on the second main side that is configured to let pass, to form and emit at least part of the optical signal from the curved light guide structure.

According to an embodiment, an optical transmission system comprises an optical transmitter for transmitting an optical signal, a curved light guide structure configured to receive the optical signal at the first pass region, and an optical receiver for receiving at least part of the optical signal at the second pass region of the curved light guide structure.

According to an embodiment, a method of manufacturing a curved light guide structure comprises providing a curved light guide structure having end faces disposed at two ends of the curved light guide structure, a first main side extending between the end faces, and a second main side opposite the first main side and extending between the end faces and configured to guide an optical signal within the spectral region. The method comprises arranging at least a first pass region on the first main side such that the first pass region is configured to receive and let pass an optical signal within the spectral region, such that the curved light guide structure is configured to guide the optical signal along an axial direction between the end faces. The method includes disposing at least a second pass region on the second main side that is configured to let pass, to form, and emit at least part of the optical signal from the curved light guide structure.

BRIEF DESCRIPTION OF THE DRAWINGS

Embodiments of the present invention will be detailed subsequently referring to the appended drawings, in which:

FIG. 1a shows a schematic top view of a curved light guide structure according to an embodiment;

FIG. 1b shows a schematic sectional side view of the curved light guide structure of FIG. 1a.

FIG. 2b shows a schematic top view of the optical system of FIG. 2a;

FIG. 3b shows a schematic top view of the optical transmission system of FIG. 3a;

DETAILED DESCRIPTION OF THE INVENTION

Figure 2A:
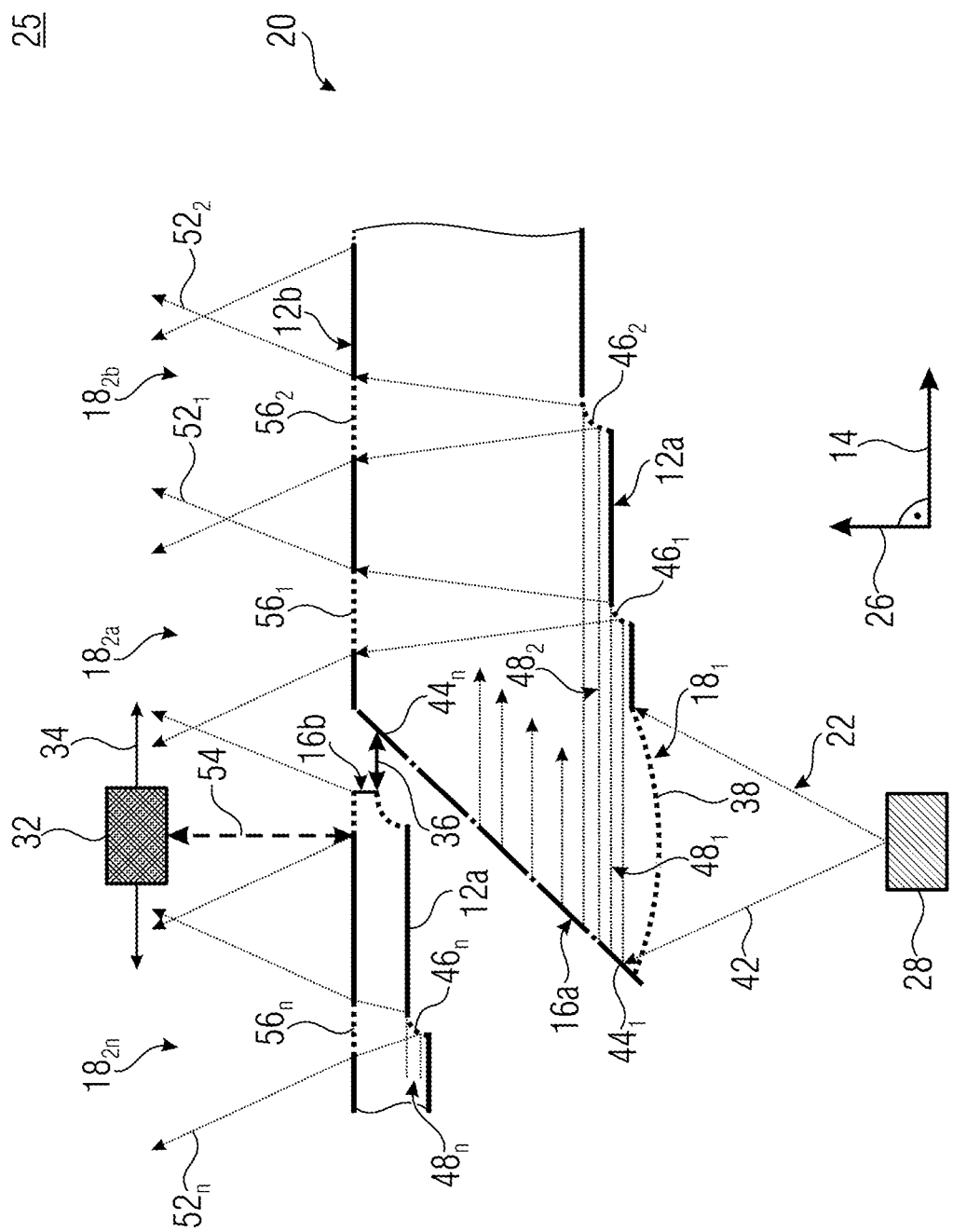
FIG. 2a shows a schematic sectional side view of an optical transmission system according to an embodiment, comprising a curved light guide structure according to an embodiment which has a plurality of reflection elements.

Before embodiments of the present invention will be explained below in detail with reference to the drawings, it shall be noted that identical elements, objects and/or structures which are identical, have the same function or the same effect are provided with the same reference numerals in the different figures, so that the descriptions of these elements that are provided in different embodiments are interchangeable or mutually applicable.

Subsequent embodiments refer to annular (ring-shaped) or circular structures and trajectories, although the invention is not limited thereto. Rather, other curvatures with constant or variable radius of curvature along an axial course of a light guide, i.e., a guide for guiding a spectral region, i.e., an optical wavelength range, can also be used. This includes, for example, oval or elliptical paths, but also circular paths as special forms thereof.

Some of the embodiments described herein enable reliable transmission of data with a wireless optical signal in the case of mutually rotating parts of an overall system. Due to the rotation, splitting of the light signal or tapping the light signal on a circular path or portion thereof may provide a reliable solution, which is implemented in embodiments. Using light guides allows translating the originally circular emission profile of the emitter into a circular ring-shaped emission profile and generating highly homogeneous illumination without the emitter being located on the axis of rotation.

FIG. 1a shows a schematic top view of a curved light guide structure 10 according to an embodiment. In the top view, a main side 12b can be seen to be curved along an axial extension direction 14 between end faces 16a and 16b. A radius of the curvature may be constant or variable. The radius of curvature may be configured arbitrarily and may, for example, be adapted to a subsequent path of movement of two objects moving relative to each other, so that the curvature of the curved light guide structure 10 is adapted to the movement of the relative motion. In addition to the radius of curvature, the axial course itself may also be adapted to the motion.

The main side 12b has a pass region $18_2$ that allows an optical signal 22 shown in FIG. 1b to enter and/or exit.

FIG. 1b shows a schematic sectional side view of the curved light guide structure 10. In the illustrated sectional side view, a further pass region $18_1$ is shown which is arranged in a main side 12a, which is arranged opposite the main side 12b. Both main sides 12a and 12b extend between the end faces 16a and 16b. The main sides 12a and 12b may, for example, be formed to be straight and may be connected to each other by straight or curved side faces. Alternatively, it is equally possible for the main sides 12a and/or 12b to be curved along a direction 24 perpendicular to the extension direction 14. Such a curvature may result in the reduction of the side faces and may, in extreme cases, result in the main surfaces 12a and 12b directly contacting each other and/or being parts, for example halves, of a continuously curved structure.

The curved light guide structure 10 is configured to receive the optical signal on one of the two main sides 12a or 12b and to re-emit the optical signal at least in parts on the other main side 12b or 12a. Further, the curved light guide structure 10 is configured to guide the optical signal 22 between the pass regions $18_1$ and $18_2$ along the axial direction, i.e., the extension direction 14. For example, the optical signal 22 may be received from a direction 26, which may be arranged perpendicular to the direction 14 and perpendicular to the direction 24 in space, at one of the pass regions $18_1$ or $18_2$, be redirected within the curved light guide structure 10 in the axial direction 14 and, after covering a distance along the axial extension direction 14, be redirected again so as to leave the curved light guide structure 10 again at least in parts at the other pass region $18_2$ or $18_1$. Corresponding redirection may be obtained, for example, by refraction, reflection and/or total reflection.

The curved light guide structure 10 may be formed to be transparent for a certain spectral region or may at least have low attenuation. For this purpose, the curved light guide structure 10 may be formed to be hollow, for example. Alternatively, the curved light guide structure 10 may comprise a material that is transparent in a particular spectral region. For example, glass materials may be transparent in a spectral region visible to humans, while other materials, such as silicon, may be transparent in other spectral regions. Embodiments provide for the use of plastics such as PMMA (polymethyl methacrylate; acrylic) and polycarbonate or mineral glasses, such as the glass known as NBK7, in addition to the aforementioned materials. Materials according to embodiments may be transparent, for example, within the range of ultraviolet wavelengths, i.e., between 100 nm and 380 nm, infrared wavelengths, i.e., between 780 nm and 1,000 μm, and/or within the range of intermediate visible wavelengths.

When emitting the optical signal, the curved light guide structure 10 or the pass region $18_1$ or $18_2$ used for this purpose may shape the optical signal 22. For example, shaping may include beam shaping, such as concentrating or scattering, but may also include redirection and/or filtering.

For example, correspondingly inclined end faces 16a and/or 16b may be used to redirect the beams from the direction 26 into the axial direction 14.

FIG. 2a shows a schematic sectional side view of an optical transmission system 25 according to an embodiment which comprises a curved light guide structure 20 according to an embodiment. The optical transmission system 25 further comprises an optical transmitter 28 and an optical receiver 32. By way of example, the curved light guide structure is arranged to be stationary with respect to the optical transmitter 28, while the optical receiver 32 is arranged to be movable along a movement path 34 relative to the optical transmitter 28 and to the curved light guide structure 20.

The sectional side view of FIG. 2a shows a section of the curved light guide structure 20 in a region where the curved light guide structure 20 formed as an annular structure is severed so that a distance 36 is established between the end faces 16a and 16b, which may have an arbitrary value greater than or equal to zero, but which provides the two end faces 16a and 16b in such a manner that the optical signal 22 is prevented from performing multiple circulations around the curved light guide structure 20. Although separation of the surface and annular structure is a simple means, alternative embodiments provide for absorbing or reflecting surfaces to be provided inside a continuous circumferential structure. This may provide clean optical separation.

The pass region $18_1$ may be configured to direct the optical signal 22 to be emitted to the end face 16a. For example, the pass region $18_1$ may be configured to direct the optical signal directly to the end face 16a.

The curved light guide structure 20 may have one or more, i.e., at least two, at least three, at least four, at least five, at least 10 or more pass regions $18_{2a}$, $18_{2n}$.

The optical signal 22 may be directed to the end face 16a, which is arranged to cause the optical signal 22 to be redirected in the axial direction 14. This may cause the optical signal 22 to be fanned out along the direction 26 referred to as the height direction by way of example. In other words, the optical signal 22 is distributed in a planar manner along the end face 16a, for example, where it is redirected. To improve the optical properties, the pass region $18_1$ may include a beam shaping means, such as a curved surface, to implement a lens function. For example, an output beam 42 may be at least partially collimated or focused and be directed to the end face 16a.

Each of the pass regions $18_{2a}$ to $18_{2n}$ set up to allow the optical signal 22 to exit may have associated therewith a sub-region $44_1$ to $44_n$, which may be disjoint from each other, i.e., not overlapping. However, embodiments are not limited to this but also allow overlapping sub-regions $44_1$ to $44_n$ to be implemented, which allows for a simple configuration since the optical paths 48 may also be somewhat scattering, i.e., not fully collimated. That part of the optical signal 22 which is redirected by means of the subregions $44_1$ to $44_n$ may, for example, be redirected from the axial direction 14 by using beam redirecting elements or reflection elements $46_1$ to $46_n$, so that in each case a part $48_1$ to $48_n$ of the optical signal 22, i.e., a portion of the beam of rays, is directed toward the respective associated pass region $18_{2a}$ to $18_{2n}$.

The reflection elements $46_1$ to $46_n$ may be, for example, specular elements, but may also comprise redirection by a curvature in the surface or the like.

According to an advantageous embodiment, at least one, several or, for example, each reflection element $46_1$ to $46_n$ may be accompanied by a material tapering of the curved light guide structure 20 along the direction 26, so that, for example, material which is no longer required along the further direction 14 for guiding the radiation due to the coupling-out of the part 48 guided in this level of height is removed or is not continued along the radial/axial course.

Embodiments provide that the end face 16a is inclined with respect to the position of the optical transmitter 28 or the direction from which the optical signal 22 is received, such that the parts $44_1$ to $44_n$ of the optical signal 22 run parallel to the direction 14, for example parallel to the main side 12b.

In addition to beam shaping in the pass regions $18_{2a}$ to $18_{2n}$, the reflection elements 46 may also cause beam shaping, such as scattering of the respective part $48_n$.

The parts $48_1$ to $48_n$ may thus be formed to be scattering, and as the distance from the curved light guide structure 20 increases, regions or cones $52_1$ to $52_n$ may increase until they overlap. The optical receiver 32 may be positioned at a distance 54 from the curved light guide structure 20, for example, which is selected such that the regions $52_1$ to $52_n$ overlap there. This allows the optical receiver 32 to be located in at least one region 52 and to thus receive the optical signal 22, since each part $44_1$ to $44_n$ has the same information content. Data transmission is also possible as long as the distance between two adjacent regions $52_1$ to $52_n$ is smaller than the spatial extent of the receiver element along the same spatial dimension. Alternatively, it is possible for the optical signals to be output in a collimated manner, i.e., with parallel beams, so that the regions $52_1$ to $52_n$ may also be disjoint from one another.

The pass regions $18_{2a}$ to $18_{2n}$ may have, for example, refractive surfaces $56_1$ to $56_n$ as an interface, which surfaces may effect optical shaping on the basis of, for example, a curvature, a variable shape, a variation in the refractive index or the like.

Thus, FIG. 2a shows a curved light guide structure having a plurality of reflection elements 46 disposed on the main side 12a and configured to reflect a portion 48 of the optical signal 22, which is reflected by the respectively associated sub-regions 44 of the end face 16a, onto the associated pass region $18_2$.

Figure 2B:
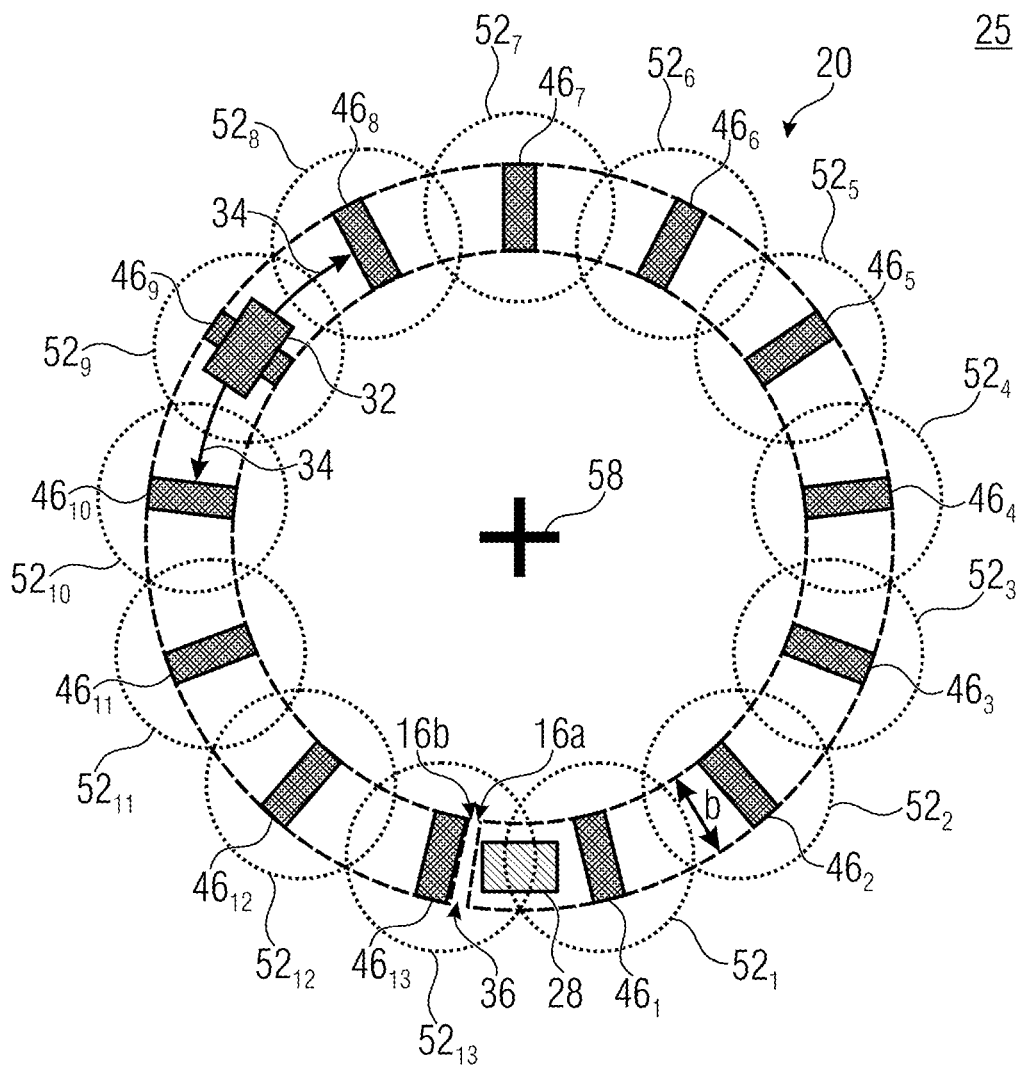

In other words, FIG. 2a shows an exemplary setup in which an optical data link comprising a transmitting unit 28 and a receiving unit 32 is shown. The data link may use a communication wavelength, for example, within the infrared, visible or ultraviolet spectral region. This spectral region may be referred to, in a simplified manner, as "light" or "electromagnetic radiation". The transmitting unit 28 and the receiving unit 32 may be arranged adjacent to, i.e. away from, an axis of rotation and may, for example, move on a circular path around the axis of rotation. Permanent data communication is made possible by the fact that data transmission is possible not only at times when the transmitting unit 28 and the receiving unit 32 are directly opposite each other, but also at times when this is not the case. Embodiments describe an annular structure that allows the optical connection between the transmitter and receiver to be permanent. There are two ways to make this possible. For one thing, the annular structure may be arranged on the transmitting unit, and the receiver moves along the annular structure on a circular path relative thereto, as shown in FIG. 2a and FIG. 2b.

In this process, the output beam 42 is focused by the first annular surface 38 and directed to the second surface/end face 16a. The second surface 16a reflects the beam and deflects it by, for example, 90° into the ring 20. In this process, the surface 38 and the end face 16a have the task of parallelizing the beams. The refracted and reflected beams 48 may travel within the plane of rotation to which the axis of rotation is perpendicular, and pass through the annular structure. The annular structure 20 includes reflection elements 46 that direct a portion of the beams 48 toward the third, refractive surface 56. Each reflection element 46 reduces the height of the annular structure and directs a portion of the power of the output signal 42 out of the plane of rotation, toward the oppositely supported receiving unit 32. The third surface 56 has the function of shaping the output beam. The surfaces 38, 16b, 46 and 56 may be formed to be planar, spherical, aspherical or may generally be formed as free forms. In this way, the circular path along which the transmitting unit and/or the receiving unit moves is homogeneously illuminated, and the optical connection remains, irrespective of the relative positions of the transmitter 28 and receiver 32 with respect to each other. By parallelizing the beams 48, multipath propagation may be avoided, and the signal jitter resulting therefrom may be reduced or minimized, which enables high data rates, for example within the range greater than $10^9$ bit/s.

In that the beams are directed in a targeted manner, the surfaces 12a and 12b are thus touched or hit by the beams 48 to a small extent or, as the case may be, are not touched or hit by the beams 48 before they have been redirected by the faces $46_n$. Within a plane of the receiver 32, such regions 52 may be covered—by the portion of the optical signal that is coupled out—which may overlap within the plane of the optical receiver 32 or at least be spaced apart by a sufficiently small distance that there will be no interruption of the communication, or only such interruptions as are within the design of the communication system. The structure may taper along a thickness direction 26 between the surfaces 12a and 12b.

Each of the pass regions $18_1$ and $18_{2a}$ to $18_{2n}$ may be bidirectionally transparent to the spectral region of the optical signal. The pass regions may have identical spectral regions or different spectral regions from each other. The surfaces 38 and/or 56 may be designated as at least part of a pass region that is transparent to the light. The surfaces 16a and/or 46, on the other hand, may be formed to be reflective, and the surface 16a may be a plane, for example. The pass regions $18_{2a}$ to $18_{2n}$ may be configured to direct the received optical signal 22 to the end face 16a, either directly or indirectly, thereby performing focusing of the optical signal 22. This allows the optical signal 22 redirected by the end face 16a to be collimated or to have practically only very little divergence.

FIG. 2b shows a schematic top view of the optical system 25 of FIG. 2a. For example, the annular structure 20 is arranged concentrically about an axis of rotation 58 about which the optical receiver 32 moves along the path of motion 34 with respect to the optical transmitter 28.

The transmitter 28 and the receiver 32 are arranged to move relative to each other to perform a relative rotational movement about the common rotational axis 58.

The curved light guide structure may be configured to redirect the optical signal 22, via a reflection element 46, toward one of the end faces 16a between the axial direction 14 and a direction oblique thereto. The curved optical waveguide structure may include a plurality of pass regions $18_{2a}$ to $18_{2n}$ in the main side 12b, wherein each pass region $18_{2a}$ to $18_{2n}$ may be associated with a sub-region 44 of the end face 16a.

A plurality of pass regions $18_{2a}$ to $18_{2n}$ may be disposed on the main side 12b. These pass regions may be configured to each output a portion of the optical signal 22 in each case, wherein at a location of the optical receiver 32, each of the pass regions $18_{2a}$ to $18_{2n}$ provides the portion of the optical signal 22 in a spatial region 52 outside of the curved light guide structure. The spatial regions 52 may overlap at the location of the optical receiver 32, such that during relative movement the optical receiver 32 with respect to the pass regions $18_{2a}$ to $18_{2n}$, at least one of the pass regions $18_{2a}$ to $18_{2n}$ is positioned with the optical receiver 32 for optical communication. Alternatively or additionally, a plurality of pass regions $18_{2a}$ to $18_{2n}$ may be disposed on the first main side. The plurality of pass regions may each be configured to receive the optical signal as described in connection with FIG. 3b. The optical transmitter may be arranged such that, at a location of the curved light guide structure, the optical signal 22 is incident on the curved light guide structure in a spatial region 62, the spatial region being larger, along an extension of the curved light guide structure, than a respective pass region $18_{2a}$ to $18_{2n}$. The pass regions $18_{2a}$ to $18_{2n}$ may be spaced apart from each other by a distance selected such that during relative movement of the optical transmitter 28 with respect to the pass regions $18_{2a}$ to $18_{2n}$, at least one of the pass regions $18_{2a}$ to $18_{2n}$ is positioned with the optical transmitter 28 for optical communication, respectively.

In other words, FIG. 2b shows the annular structure as a transmitting unit in a top view. The reflection elements 46 are distributed throughout the ring to provide homogeneous illumination. The step height is chosen so that the ring is approximately 360 degrees and ends with the end face 16a. The resulting gap 36 should be as small as possible so that complete coverage remains. The interruption of the ring prevents multiple circulations of the beams and allows total reflection on the surface 16a.

Each of the pass regions $18_{2a}$ to $18_{2n}$ is configured to illuminate a spatial region 52 outside the curved light guide structure and to provide the respective portion of the optical signal at or in this region. As shown in FIG. 2a, the pass region $18_1$ may be located adjacently to the end face 16a, which may, for example, provide a beginning or start of the curved path.

Figure 3A:
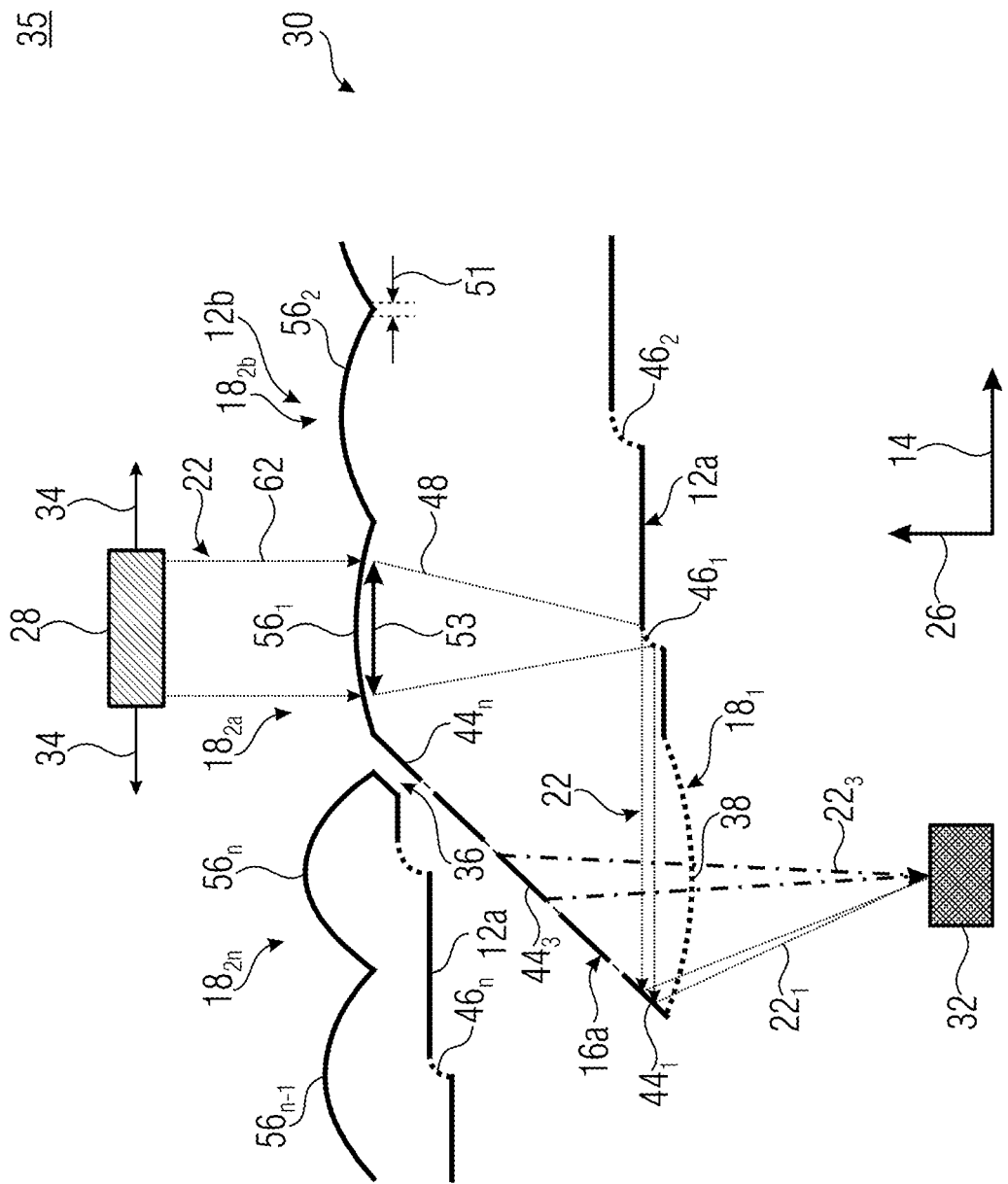
FIG. 3a shows a schematic sectional side view of an optical transmission system according to an embodiment, comprising a curved light guide structure according to an embodiment, wherein an optical receiver is arranged to be stationary with respect to the curved light guide structure.

FIG. 3a shows a schematic sectional side view of an optical transmission system 35 according to an embodiment, comprising a curved light guide structure 30 according to an embodiment. Unlike in the optical transmission system 25, in the optical transmission system 35, for example, the optical receiver 32 is arranged to be stationary with respect to the curved light guide structure 30, while the optical transmitter 28 moves along the path of movement 34 relative thereto. Unlike a complete-coverage reception option shown in FIG. 2a and FIG. 2b, a requirement placed upon the curved light guide structure 30 may be predominantly formulated to allow, in any relative position between the curved light guide structure 30 and the optical transmitter 28, adequate reception of the optical signal 22 with the curved light guide structure 30 and corresponding transmission to the optical receiver 32. The optical signal 22 may be transmitted in a region 62 by the optical transmitter 28, the region 62 being, for example, a region that is illuminated by the optical signal 22 on the transmitter side.

In other words, the pass regions $18_{2a}$ to $18_{2n}$ may be arranged such that a distance between the pass regions $18_{2a}$ to $18_{2n}$ is arranged such that the distance 51 is at most equal to the spatial extent 53 of the optical signal, or of the region.

The setup of the curved light guide structure 30 may be analogous or inverse to the curved light guide structure 20. Thus, a plurality or multitude of refractive surfaces $56_1$ to $56_n$ may be arranged on the main side 12b facing the optical transmitter 28. The refractive surfaces $56_1$ to $56_n$ may be directly adjacent to one another, but may also be arranged at a small, optically non-interfering distance 51 from one another. The refraction of the refractive surfaces $56_1$ to $56_n$ may be used to effect focusing of the optical signal 22 onto the respective reflection element 46 arranged with respect to the optical transmitter 28, which may effect the same redirection described in connection with FIG. 2a, only in a different direction. The optical signal 22 or at least part of the optical signal 22 may thus also proceed in parallel inside the curved light guide structure 30, "parallel" being understood to mean that the optical signal 22 is parallel to the extension direction 14 and/or the plane of rotation, since the main side 12b is curved and since deviations occur with respect to parallelism to the optical signal 22.

Depending on which of the refractive surfaces $56_i$, i.e., $56_1, \ldots, 56_n$ with $i=1, \ldots, n$, the optical signal 22 is received by the curved light guide structure 30, the optical signal 22 is directed to an associated reflection element $46_i$, which may redirect the optical signal 22 and direct it to the associated region $44_i$. That is, the optical signal 22 may be directed through the curved light guide structure 30 at different times in different sections/at different heights along the direction 26. This allows the optical signal 22 to pass through the beam shaping means, or pass region $18_1$, at different times from different directions and hit the optical receiver 32. The curved light guide structure 25 is configured, for example, such that the pass regions $18_{2a}$ to $18_{2n}$ are configured to direct the received optical signal 22 to the respectively associated reflection element $46_i$, which is configured to reflect the optical signal 22 onto a sub-region $44_i$ of the end face 16a that is associated with the reflection element $46_i$. The pass region $18_1$ is arranged to output the optical signal reflected by the end face 16a, regardless of the sub-region from which the optical signal 22 is deflected.

The pass regions $18_{2a}$ to $18_{2n}$ may be configured individually or in each case to direct the optical signal 22 to one of the reflection elements 46. The arrangement of the pass region $18_{2a}$ to $18_{2n}$ and the reflection element 46 may be configured to transmit the optical signal 22 to the end face 16a in a collimated manner.

Similar to the curved light guide structure 20, the reflection elements or reflection elements 46 may implement a taper of the curved light guide structure with respect to a distance between the main sides 12a and 12b. The reflection elements 46 may comprise or form edges of the respective material taper.

In other words, another possibility is to arrange the annular structure or curved light guide structure on or at the receiving unit 32 so that the oppositely supported transmitting unit 28 may move along the annular structure on an exemplary circular path, as shown in FIG. 3a. The output beam of this arrangement is focused from the refractive surface 56 onto the reflection element 46 located therebelow. The reflection element 46 directs the beam 48 toward the end face 16a and parallels it. The end face 16a directs the beam, i.e., the optical signal 22, toward the arranged receiving unit 32. The surface 38 focuses the beam onto the receiving unit 32.

It should be noted that characteristics such as parallelizing, collimating, as well as a parallel course to one or more surfaces are not to be understood as being implementable without any tolerance. Rather, it is possible to provide tolerances which are both due to and simplify manufacturing, for example within a range of ±10%, ±5%, or ±2%. For example, the curved light guide structure 20 and/or the curved light guide structure 30 may be formed to compensate for deviations from a parallel course of the beams to the extension direction 14 by providing distances in the regions 44 and/or by providing distances along the height direction 26 between the reflection elements 46, or the curvature of the surface 38 is designed to be able to compensate for a tolerance.

Figure 3B:
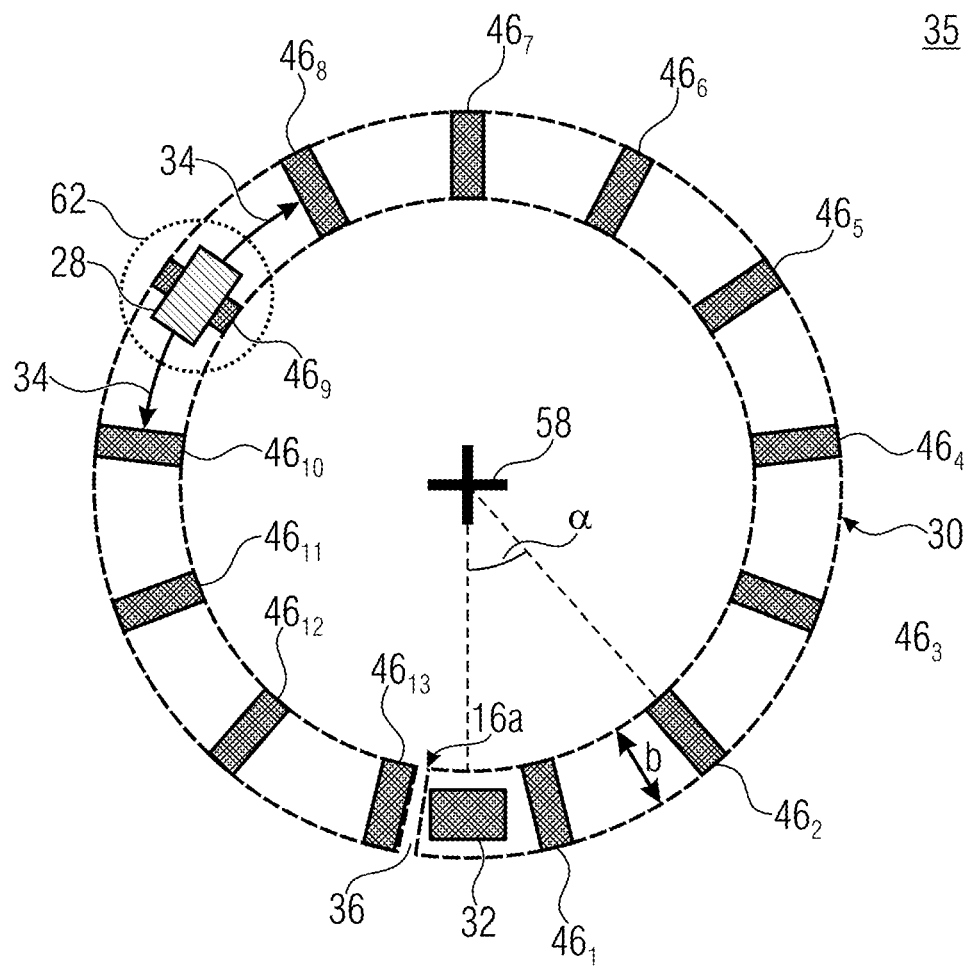

FIG. 3b shows a schematic top view of the optical transmission system 35. The region 62 of the optical transmitter 28 is advantageously configured such that in each rotational position of the optical transmitter 28 about the rotational axis 58, the region 62 overlaps with one of the pass regions $18_{2a}$ to $18_{2n}$, which means that the optical signal 22 is directed to one of the reflection elements 46. As described in connection with the optical transmission system 25, short interruptions are also possible as long as no excessively long communication interruption occurs. Relatively longer interruptions are also possible, should such a long communication interruption be justifiable or even desired.

In other words, FIG. 3b shows the annular structure of FIG. 3a from above. The reflection elements 46 are distributed over the entire ring, as in the case of the annular structure as the transmitting unit, see FIG. 2b. They direct the incident light of the oppositely supported transmitting units 28 in the direction of the arranged receiving unit 32. Depending on the position of transmitting unit 28 and the receiving unit 32, the light thereby covers a distance between 0° and approximately 360° of a circumferential angle α through the annular element. In any case, the end face 16a of the annular structure directs a large amount of or even the entire optical signal 22 in the direction of the receiving unit 32, so that multiple circulations of the optical signal 22 in the annular structure 30 is not possible.

Further, it is also conceivable that a single annular structure is used simultaneously for both purposes, that is, to collect the optical signal at different positions in order to make it available to a receiving unit or to collect it at one position and make it available to the receiving unit at several positions. Advantageously, both the arranged transmitting unit 28 and the arranged receiving unit 32 are connected to the annular element simultaneously. This may be made possible by a beam splitting element as shown in FIG. 4.

Figure 4:
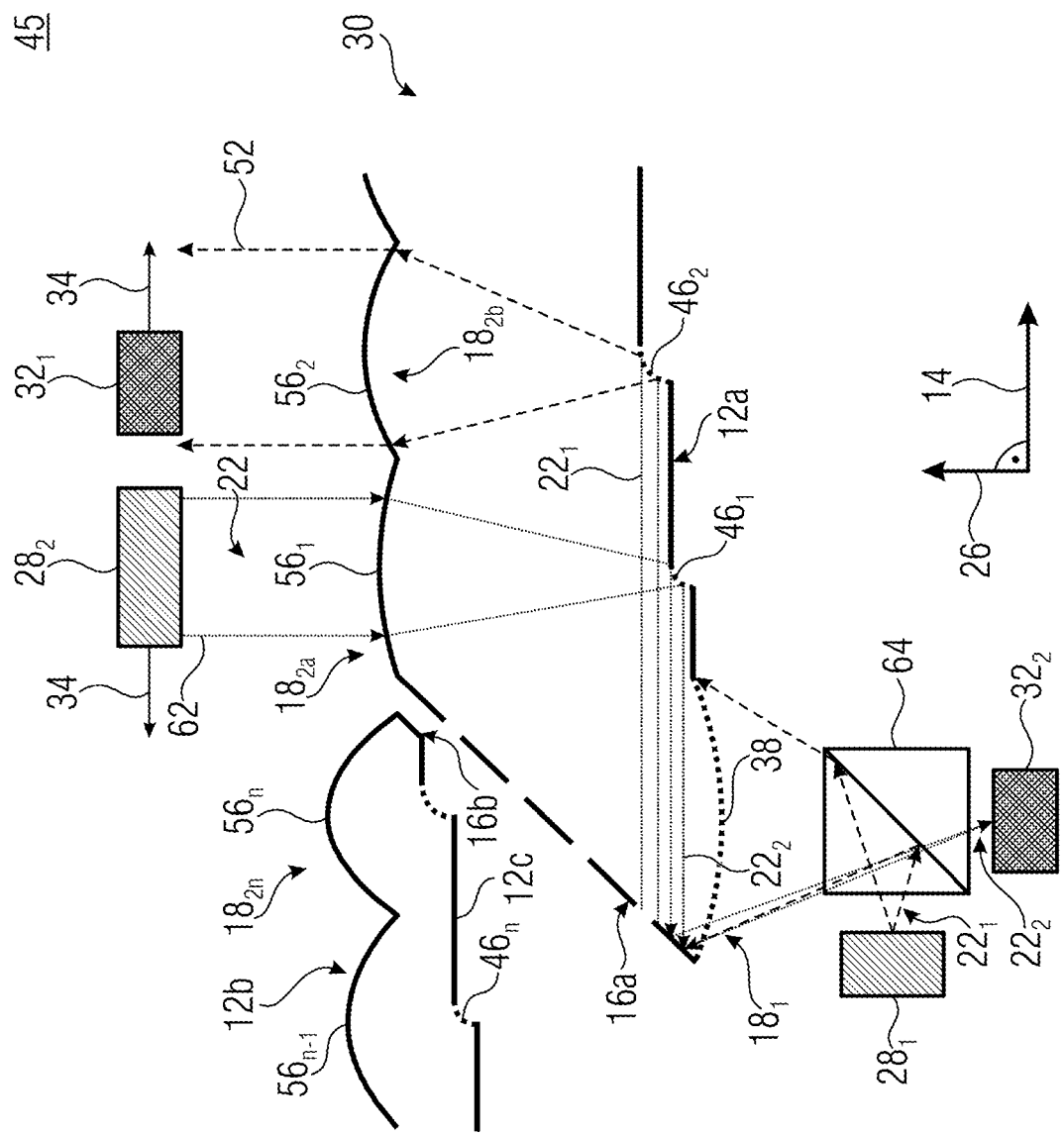
FIG. 4 shows a schematic sectional side view of an optical transmission system according to an embodiment in which the curved light guide structure according to an embodiment is formed such that a beam splitting element is arranged adjacent to an end face.

FIG. 4 shows a schematic sectional side view of an optical transmission system 45 in which, for example, the curved light guide structure 30 is arranged. Compared to the optical transmission system 45, a beam splitting element or beam splitter 64 is arranged adjacent to the end face 16a and the pass region $18_1$ with respect to the beam shaping means 38, with which beam splitter 64 optical signals $22_1$ and $22_2$ can be combined with and/or separated from each other. An optical signal $22_1$ transmitted to the beam splitter 64 by means of an optical transmitter $28_1$ and forwarded in the direction of the pass region $18_1$ may be distributed to a plurality of pass regions, in particular all pass regions associated with a corresponding reflection element 46, as described in connection with FIG. 2a, so that transmission between the transmitter $28_1$ and the receiver $32_1$ is possible independently of the position of a first optical receiver $32_1$ along the path of movement 34. Simultaneously, but also alternating in time, an optical transmitter $28_2$ arranged adjacent to the optical receiver $32_1$ and on the main side 12b may transmit a signal via a pass region arranged on the second main side 12b towards a reflection element 46, so that redirection occurs on the end face 16a, so that the optical signal $22_2$ is directed towards a second optical receiver $32_2$ on the main side 12a.

A plurality of pass regions $18_{2a}$ to $18_{2n}$ may be arranged on the main side 12b, and at least one pass region is arranged on the main side 12a. The optical transmission system 45 includes at least two optical transmitters $28_1$ and $28_2$ and at least two optical receivers $32_1$ and $32_2$. The beam splitter 64 is disposed adjacent to the pass region $18_1$ and configured to direct an optical signal $22_2$ received from the pass region $18_1$ to the optical receiver $32_2$ disposed adjacent to the beam splitter 64 and to direct an optical signal received from the optical transmitter $28_1$ to the pass region $18_1$. Adjacent to the main side 12b, the optical transmitter $28_2$ and the optical receiver $32_1$ are arranged adjacent to a pass region different therefrom.

In other words, FIG. 4 shows the annular structure when used simultaneously as a transmitting/receiving unit. Both the oppositely supported transmitting unit $28_2$ and the oppositely supported receiving unit $32_1$ can move in a circular path along the annular structure. If the annular structure is used individually as a transmitting or receiving unit, a second transmission path with its own annular structure may be additionally arranged on a second circular path to enable bidirectional transmission. Otherwise, the transmission system 45 may also be configured to enable bidirectional transmission. FIG. 4 thus shows a curved light guide structure in which each reflection element 46 is associated with a sub-region of the end face 16a, and each of the pass regions $18_{2a}$ is associated with a reflection element 46. The pass region $18_1$ and/or a received pass region $18_2$ may be disposed adjacent to the end face 16a.

The curved light guide structures described above have in common that the optical signal 22 and/or $22_1$ received by the pass region are directed along the axial direction 14 in a manner in which they are spatially distributed between the main sides 12a and 12b and are substantially parallel to the course of the main sides 12a and/or 12b. The curved light guide structure may have a plurality or multitude of reflection elements 46 distributed along the thickness direction 26, each configured to couple out a spatial portion of the optical signal.

Figure 5:
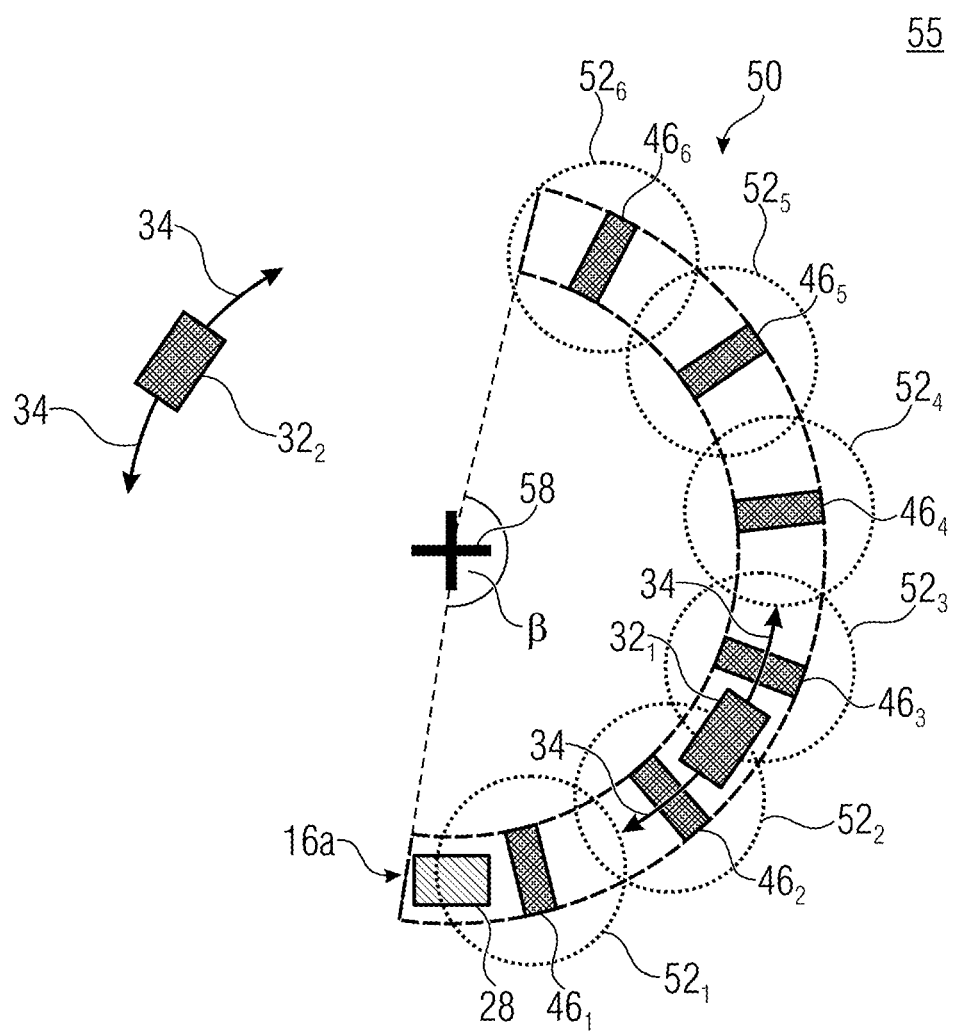
FIG. 5 shows a schematic top view of an optical transmission system according to an embodiment, wherein a curved light guide structure according to an embodiment has a circumferential angle β about the axis of rotation that is smaller than 360°.

FIG. 5 shows a schematic top view of an optical transmission system 55 according to an embodiment in which a curved light guide structure 50 is arranged. Compared to the curved light guide structure 20, the curved light guide structure 50 has a circumferential angle β about the axis of rotation 58 that is less than 360°, advantageously less than 270°, and possibly less than 180°. Like other curved light guide structures described herein, the curved light guide structure 50 may describe the shape of an elliptical ring segment. This includes, as a special case, the shape of a circular ring segment. Embodiments refer to curved light guide structures whose curvature with respect to a circumferentially closed path has an opening angle β of at least 5° and less than 360°, of at least 10° and less than 350°, or of at least 170° and less than 300°.

Now, the only partial formation of the curved light guide structure 20 as a curved light guide structure 50 causes an optical receiver $32_1$ moving along the path of movement 34 with respect to the optical transmitter 28 to be temporarily outside the regions $52_1$ to $52_6$. In order to prevent a communication breakdown, an additional optical receiver $32_2$ may be arranged, for example, which is arranged to be stationary with respect to a relative position to the optical receiver $32_1$. Alternatively, as soon as the optical receiver $32_1$ is outside the regions 52, the optical receiver $32_2$ may be in a receiving region so that at least one of the optical receivers $32_1$ and $32_2$ may receive the optical signal. This embodiment may be scaled as desired. For example, when the curved light guide structure is formed approximately as a quarter circle, a number of four optical receivers may be used to allow uninterrupted data transmission. Other numbers of three, five or more optical receivers are also possible.

The optical transmission system 50 may be configured such that the optical transmitter 28 is stationarily connected to the curved light guide structure 50. The curved light guide structure 50 may describe a portion of a circulating path.

Figure 6:
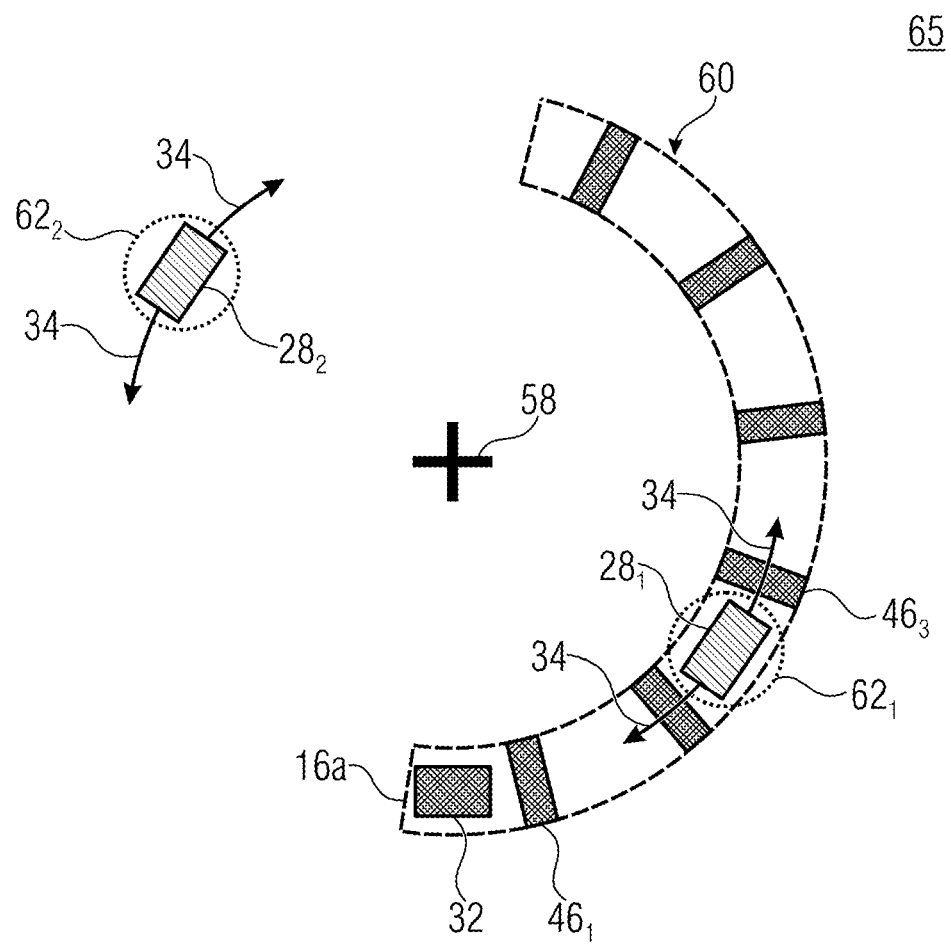
FIG. 6 shows a schematic top view of an optical transmission system comprising a curved light guide structure according to an embodiment, wherein the curved light guide structure describes only a sub-region of a circumferential path.

FIG. 6 shows a schematic top view of an optical transmission system 65 having a curved light guide structure 60 according to an embodiment, which may be formed similarly to the curved light guide structure 30, wherein the curved light guide structure 60 describes only a sub-region of a circumferential path as compared to the curved light guide structure 30, as described for the curved light guide structure 50. Similarly, the optical transmission system 65 comprises two or more optical receivers $28_1$ and $28_2$, which may be stationary with respect to each other and may move along the path of movement 34. Just like an optical receiver may be arranged, in the optical transmission system 55, at each relative position between transmitter(s)/receiver(s) with respect to the curved light guide structure, at least one optical transmitter $28_1$ or $28_2$ may be arranged, in the optical transmission system 65, at each relative position with respect to the curved light guide structure 60 to transmit the optical signal to the curved light guide structure 60.

In other words, in one embodiment, it is possible to reduce the annular structure to a partial annular element. In this case, the oppositely supported transmitting/receiving unit may be exist several times and may be evenly spaced along the circular path to maintain the connection. The more oppositely supported transmitting/receiving units are possible or implemented, the smaller the angular extent of the annular element may be selected. To enable a high data rate, the oppositely located transmitting/receiving units can be synchronized electrically or optically. For example, by way of optics, an optical delay element can be inserted. By electrical means, it may be ensured that the data lines are of the same length for all oppositely located transmitting/receiving units, or delay elements may be inserted. While FIG. 5 shows a partial annular piece as a transmitting unit in a view from above, for example, in which a receiver is located above the ring section comprising a transmitting unit, FIG. 6 shows a partial annular piece as a receiving unit in a view from above, for example, in which a transmitter is located above the partial annular piece comprising a receiving unit.

Figure 7:
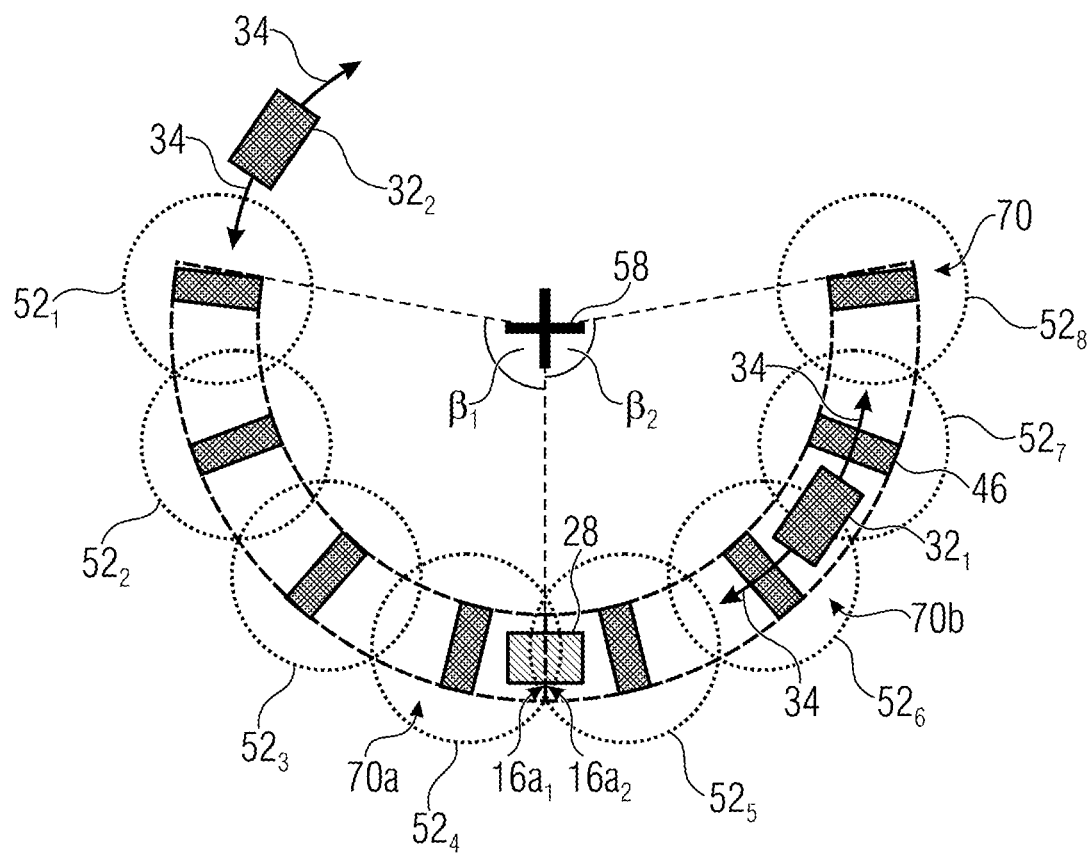
FIG. 7 shows a schematic top view of an optical transmission system according to an embodiment, which comprises a curved light guide structure according to an embodiment, said structure comprising at least two segments.

FIG. 7 shows a schematic top view of an optical transmission system 75 according to an embodiment which comprises a curved light guide structure 70 having at least a segment 70a and a segment 70b which together form an overall structure, the curved light guide structure 70. The segments 70a and 70b may be of equal or different size with respect to the aperture angle β1 and β2 describing the segments with respect to the axis of rotation 58. Each of the segments has a tilted end face $16_{a1}$ and $16_{a2}$, so that the optical signal received from the optical transmitter 28 is directed in different directions and in each of the optically separated segments 70a and 70b. The end faces $16_{a1}$ and $16_{a2}$ may be disposed adjacent to each other in a center region of the curved light guide structure 70. Pass regions configured for the entry of the optical signal into the curved light guide structure may also be arranged in the center region and adjacent to the end faces $16_{a1}$ and $16_{a2}$, respectively, as described, e.g., in connection with FIG. 2a.

In other words, FIG. 7 shows a symmetrical partial annular piece as a transmitting unit. A view from, for example, above is shown. There is one receiver located above the partial annular piece comprising a transmitting unit.

Figure 8:
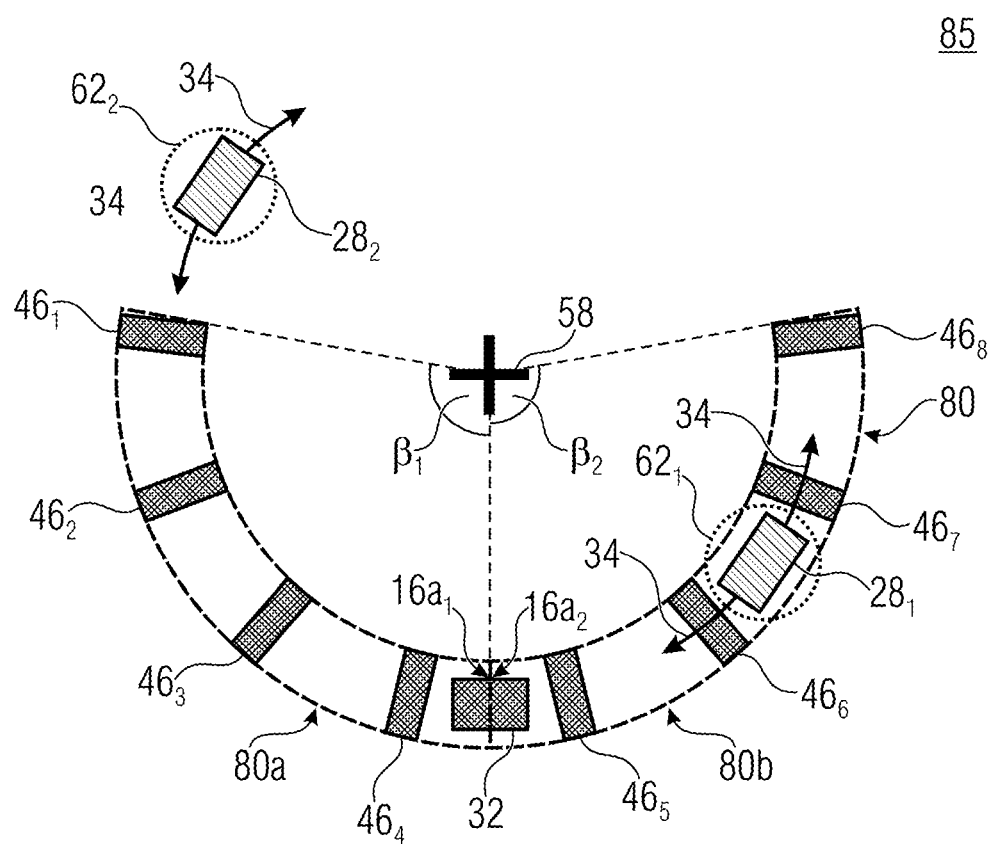
FIG. 8 shows a schematic top view of an optical transmission system according to an embodiment that is set up in a manner complementary to the optical transmission system of FIG. 7.

FIG. 8 shows a schematic top view of an optical transmission system 85 according to an embodiment, which has a curved light guide structure 80 according to an embodiment. In this regard, the optical transmission system 85 has a setup complementary to that of the optical transmission system 75. That is, it has two segments 80a and 80b which are arranged, for example, symmetrically with respect to a central region wherein the inclined end faces $16_{a1}$ and $16_{a2}$ are arranged, and which are configured to direct received optical signals to the optical receiver 32.

The segments 80a and 80b, like the segments 70a and 70b, may for example have an aperture angle of approximately 90°. Smaller and/or larger angles are possible. Also, the segments may be formed so large that they each have nearly 180° or even exactly 180° or more, which may make the arrangement of a respective second or otherwise multiple transmitter and/or receiver redundant and/or optional in order to simultaneously provide continuous communication.

In other words, in a further embodiment, the annular element may also be set up symmetrically, so that the transmission or reception signal is divided into a right and left wing by the second surface $16_{a1}$ and $16_{a2}$, respectively, where right and left, as well as top and bottom, and front and back, are purely illustrative and not restrictive. The annular structure may be formed either as a full annular or as partial annular pieces. FIGS. 7 and 8 each show the design as a partial annular piece. For example, the reflective or specular end face $16_{a1}$ and $16_{a2}$ may be located in the center and/or may be duplicated, i.e., for each wing or segment, to allow reflection in both directions. While FIG. 7 shows a symmetrical partial annular piece as a transmitting unit in a top view, in which there is a receiver arranged above the partial annular piece comprising the transmitting unit, FIG. 8 shows a symmetrical partial annular piece as the receiving unit 32 in a top view, in which there is a receiver arranged above the partial annular piece comprising the receiving unit 32.

Unlike in FIG. 7, where the optical transmitter is arranged to be stationary in the center area, the optical receiver 32 in the optical transmission system 85 may be arranged to be stationary in the center area.

Figure 9:
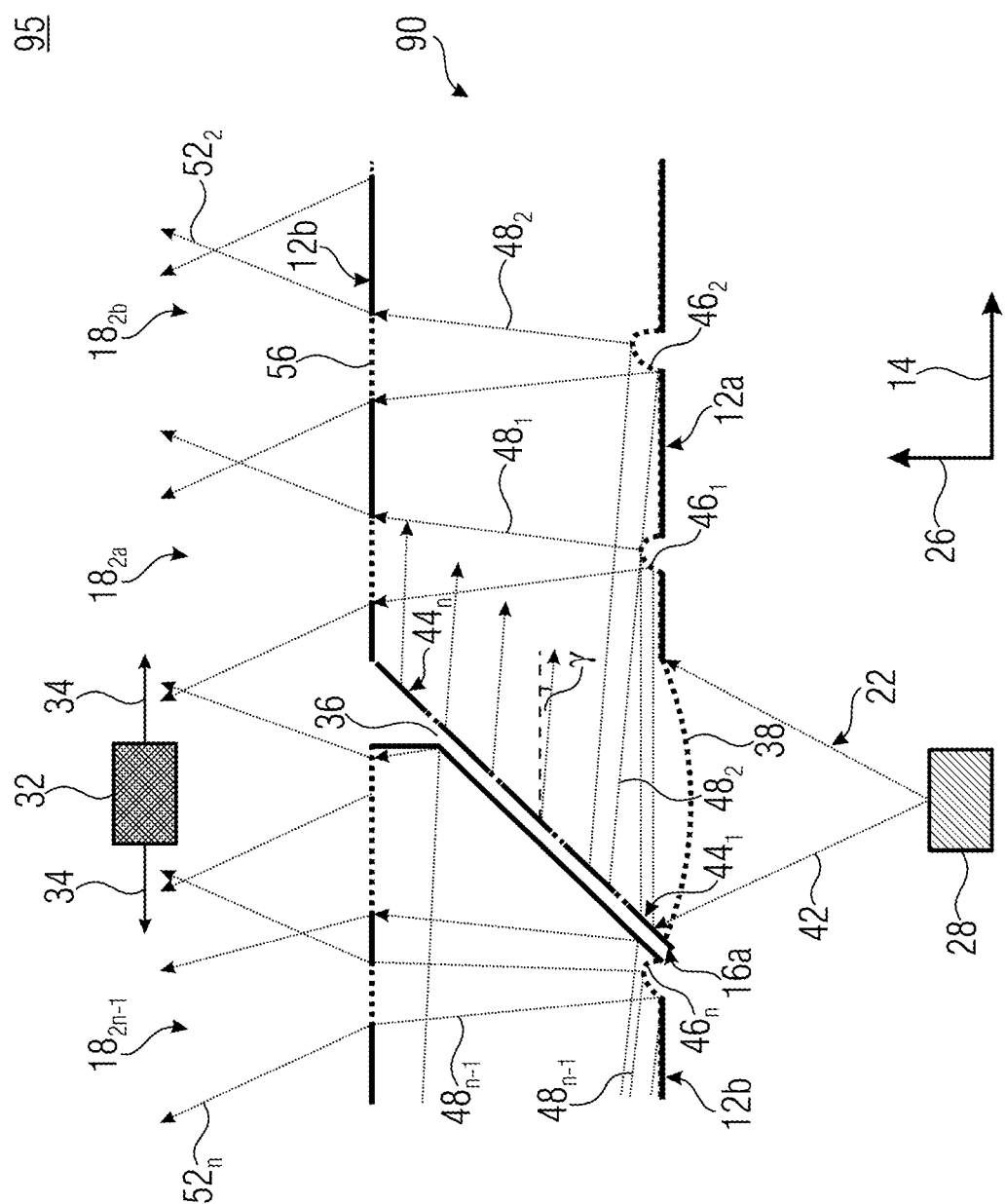
FIG. 9 shows a schematic sectional side view of an optical transmission system according to an embodiment, comprising a curved light guide structure having a constant thickness according to an embodiment.

FIG. 9 shows a schematic sectional side view of an optical transmission system 95 according to an embodiment, comprising a curved light guide structure 90 according to an embodiment. The curved light guide structure 90 may be formed similarly to the curved light guide structure 20, at least in terms of the mode of operation with respect to the optical transmitter 28 and the optical receiver 32, so that in this respect the optical transmission system 95 also corresponds to the optical transmission system 25.

The curved light guide structure 95 differs with respect to the internal reflection of the optical signal 22 to direct the optical signal 22 to the optical receiver 32. While the redirection at the end face 16a in the optical transmission system 25 is configured such that the optical signal 22 is arranged substantially parallel to the axial extension direction 14 after reflection, the end face 16a in the curved light guide structure 90 is configured such that the optical signal is intentionally inclined at an angle α with respect to the axial extension direction 14, so that the optical signal is reflected back towards the main side 12a. The end face 16a is thus configured to redirect the optical signal 22 in a direction which is inclined with respect to the course of the main side 12b, in a direction towards the main side 12a. As a result, the reflection elements $46_1$ to $46_n$ are also illuminated or hit by the portions $48_1$ to $48_n$. The reflection elements are configured to redirect and/or reflect the respective portion that is unchangedly associated with a subregion of the end face 16a.

The plurality of reflection elements 46 are arranged with increasing distance from the end face 16a, and different sub-regions $44_1$ to $44_n$ of the end face 16a are configured, on the basis of the inclined direction, to redirect a respectively associated spatial portion 48 of the optical signal 22 to a respectively associated reflection element 46, which then will redirect the corresponding portion towards the associated pass region $18_2$. With increasing distance to the end face 16a, the reflection elements 46 may, for example, be increasingly larger, smaller or exhibit different inclination, and may thus be adapted to the light propagation within the curved light guide structure 90. That is, dimension of the reflection elements 46 may be different from one another along the direction 14 and/or 26 and/or with respect to a direction of inclination. Each reflection element 46 may be uniquely associated with a height range of the curved light guide structure between the main sides 12a and 12b, such as across the sub-regions 44. This height range may be variable across the curved light guide structure.

In other words, in another embodiment, the surfaces 16a and 38 of the annular element are shaped to direct the refracted and reflected beams 48 onto the reflection elements 46 in such a way that the power density on all reflection elements 46 is identical. At the same time, all reflection elements are found at the same height, since, for example, the thinning according to FIG. 2a may be dispensed with. The surface elements of the main side 12a may be interrupted by the reflection elements 46. The shadow cast by the beam 48 and the reflection elements may largely or completely cover the surface elements of the main side 12a, for example at least 80%, at least 90% or up to 100%, which means that a reflection on the main side 12a may be avoided and the entire optical signal may be coupled out. The surface elements can be those areas of the main side 12a that are not covered by optical elements.

Another embodiment relates to the fact that the reflection elements are not extended over the entire width of the ring. In this way, the annular structure may be more finely graduated or the maximum ring size may be increased. Thus, the same height position and/or the same sub-region on the end face 16a may be used by several reflection elements, so that although each reflection element may have associated with it a subregion on the end face 16a, the corresponding sub-region along the height direction 26, but possibly not along the lateral direction along the ring width is used by several reflection elements. The curved light guide structure 90 may be referred to as a non-step annular structure.

The present embodiments deal with the problem of enabling data transmission over two components rotating with respect to each other. This is not possible, or is possible only to a very limited extent, with cables. In addition, the axis of rotation may remain free for operational reasons. This is useful, for example, for computer tomographs or motors. The structure of the presented idea of a solution differs significantly from conventional technology. Unlike DE 10 2007 041 927 A1, the idea is based on beam optics. In contrast to DE 28 46 526 A1, however, data rates within the range of $>10^9$ bit/s are anticipated. According to the invention, this is made possible by setting up an ordered beam guidance in the light guide structure in order to effectively avoid multipath propagation.

Several more aspects of the present invention will be formulated below:

According to a first aspect, a curved light guide structure configured to guide an optical signal within a spectral region comprises the following:
  end faces disposed at two ends of the ring segment structure;
  a first main side extending between the end faces, and a second main side located opposite the first main side and extending between the end faces;
  at least a first pass region on the first main side, the first pass region being configured to receive and let pass an optical signal within the spectral region, the curved light guide structure being configured to guide the optical signal along an axial direction between the end faces; and
  at least a second pass region on the second main side that is configured to let pass, form and emit at least part of the optical signal from the curved light guide structure.

According to a second aspect in accordance with the first aspect, the first pass region is configured to direct the optical signal to be emitted to a first end face of the end faces, wherein the second pass region is associated with a sub-region of the end face; and the part of the optical signal is based on a portion of the optical signal that is redirected at the sub-region; or
  wherein the first pass region is configured to direct the received optical signal to a reflection element configured to reflect the optical signal onto a sub-region, associated with the reflection element, of a first end face of the end faces; and the second pass region is configured to output the optical signal reflected by the end face.

According to a third aspect in accordance with the second aspect, the first pass region is configured to direct the received optical signal to the first end face of the end faces, thereby performing focusing of the optical signal so that optical signal redirected from the first end face will collimate.

According to a fourth aspect in accordance with the second or third aspect, the first pass region is configured to direct the received optical signal to a reflection element; wherein the arrangement of the first pass region and the reflection element is configured to transmit the optical signal to the first end face in a collimated manner.

According to a fifth aspect in accordance with any of the preceding aspects, the curved light guide structure is configured to redirect the optical signal at one of the end faces between the axial direction and a direction oblique thereto; wherein the curved light guide structure comprises a plurality of second pass regions in the second main side, each of the second pass regions having a sub-region of the end face associated therewith.

According to a sixth aspect in accordance with the fifth aspect, the curved light guide structure comprises a plurality of reflection elements that are disposed on the first main side within the curved light guide structure and are configured to reflect a portion of the optical signal that is reflected by the associated end face portion onto the associated second pass region.

According to a seventh aspect in accordance with the sixth aspect, the end face is configured to redirect the optical signal in a direction parallel to a course of the second main side, the second main side being tapered in regions of the reflection elements with respect to a distance between the first main side and the second main side, the reflection elements comprising edges of a respective material taper.

According to an eighth aspect in accordance with the sixth aspect, the end face is arranged to redirect the optical signal in an inclined direction inclined to a course of the second main side, and in a direction towards the first main side, wherein the plurality of reflection elements are arranged at an increasing distance from the end face, and the different sub-regions of the end face redirect, on the basis of the inclined direction, a respectively associated spatial portion of the optical signal to a respectively associated reflection element.

According to a ninth aspect in accordance with any of the sixth to eighth aspects, each reflection element is uniquely associated with a height region of the curved light guide structure between the first and second main sides that is determined by the sub-region of the end face.

According to a tenth aspect in accordance with any of the fifth to ninth aspects, each of the second pass regions is configured to provide the respective portion of the optical signal to a spatial region outside the curved light guide structure; wherein the spatial regions overlap at a distance adapted to a communication receiver.

According to an eleventh aspect in accordance with any of the preceding aspects, the first pass region is disposed adjacent to an end face.

According to a twelfth aspect in accordance with any of the preceding aspects, the curved light guide structure is configured to redirect the optical signal via a reflection element toward one of the end faces between the axial direction and a direction oblique thereto; wherein the curved light guide structure comprises a plurality of first pass regions in the first main side, each first pass region being associated with a sub-region of the end face.

According to a thirteenth aspect in accordance with the twelfth aspect, the first pass regions are arranged such that a distance between the first pass regions is configured such that the distance is at most equal to the spatial extent of the optical signal.

According to a fourteenth aspect in accordance with the twelfth or thirteenth aspect, a sub-region of the end face is associated with each reflection element; and a reflection element is associated with each of the first pass regions.

According to a fifteenth aspect in accordance with any of the twelfth to fourteenth aspects, the second pass region is disposed adjacent to an end face.

According to a sixteenth aspect in accordance with any of the preceding aspects, the curved light guide structure is configured to redirect the optical signal received by the first pass region in a spatially distributed manner between the first main side and the second main side and along the axial direction and substantially parallel to the second main side, the curved light guide structure comprising a plurality of reflection elements that are distributed along a thickness direction and are configured to each couple out a spatial portion of the optical signal.

According to a seventeenth aspect in accordance with any of the preceding aspects, the shape of the curved light guide structure describes an ellipsoidal ring segment.

According to an eighteenth aspect in accordance with any of the preceding aspects, the shape of the curved light guide structure describes a circular ring segment.

According to a nineteenth aspect in accordance with any of the preceding aspects, a curvature of the curved light guide structure relative to a circumferentially closed path has an aperture angle of at least 5° and less than 360°.

According to a twentieth aspect in accordance with any of the preceding aspects, the first and/or second pass region is convexly curved, spherically curved, aspherically curved, or a freeform shape.

According to a twenty-first aspect in accordance with any of the preceding aspects, the curved light guide structure comprises a first segment of an overall structure and a second segment of equal or different size, the end faces of the two segments being disposed adjacent to each other in a center region, wherein the first pass region or the second pass region is disposed in the center region.

According to a twenty-second aspect in accordance with any of the preceding aspects, the first pass region and the second pass region are bidirectionally transparent to the wavelength region.

According to a twenty-third aspect, an optical transmission system comprises:
an optical transmitter for transmitting the optical signal;
a curved light guide structure for receiving the optical signal at the first pass region according to any of the preceding claims; and
an optical receiver for receiving a portion of the optical signal at the second pass region of the curved light guide structure.

According to a twenty-fourth aspect in accordance with the twenty-third aspect, the optical transmitter and the optical receiver are arranged to be movable relative to each other to perform relative rotational movement about a common axis of rotation.

According to a twenty-fifth aspect in accordance with the twenty-fourth aspect, the curved light guide structure is disposed to be stationary with respect to one of the optical receiver and the optical transmitter.

According to a twenty-sixth aspect in accordance with the twenty-third to twenty-sixth aspects, a plurality of second pass regions are arranged on the second main side and are configured to each output a portion of the optical signal, wherein at a location of the optical receiver, every other pass region provides the portion of the optical signal to a spatial region outside of the curved light guide structure; wherein the spatial regions overlap at the location of the optical receiver such that upon a relative movement of the optical receiver with respect to the second pass regions, at least one second pass region is positioned with the optical receiver for optical communication, respectively; and/or
wherein a plurality of first pass regions are arranged on the first main side, each configured to receive the optical signal, the optical transmitter being arranged such that at a location of the curved light guide structure the optical signal is incident on the curved light guide structure in a spatial region, the spatial region along the extension of the curved light guide structure being larger than a respective first pass region; wherein the first pass regions are spaced apart from one another by a distance selected such that upon a relative movement of the optical transmitter with respect to the first pass regions, at least one respective first pass region positions with the optical transmitter for optical communication.

According to a twenty-seventh aspect in accordance with the twenty-third to twenty-sixth aspects, the optical receiver is a first optical receiver wherein the optical transmitter is stationarily connected to the curved light guide structure, wherein the curved light guide structure describes a sub-region of a circumferential path, and the optical transmission system comprises at least one second optical receiver such that at each relative position, at least one optical receiver is disposed, with respect to the curved light guide structure, such as to receive a portion of the optical signal.

According to a twenty-eighth aspect in accordance with the twenty-seventh aspect, the curved light guide structure is formed symmetrically about a center region and toward the end faces, wherein the first pass region is disposed in the center region and the optical transmitter is disposed to be stationary with respect to the center region; or
wherein the second pass region is disposed in the center region and the optical receiver is disposed to be stationary with respect to the center region.

According to a twenty-ninth aspect in accordance with the twenty-third to twenty-eighth aspects, the optical transmitter is a first optical transmitter, and the optical receiver is stationarily connected to the curved light guide structure, wherein the curved light guide structure describes a sub-region of a circumferential path, and the optical transmission system comprises at least one second optical transmitter such that at each relative position, at least one optical transmitter is disposed, with respect to the curved light guide structure, so as to transmit the optical signal to the curved light guide structure.

According to a thirtieth aspect in accordance with the twenty-third to twenty-ninth aspects, a plurality of pass regions are arranged on the second main side, and at least one pass region is arranged on the first main side;
wherein the optical transmitter is a first optical transmitter, wherein the optical receiver is a first optical receiver; wherein the optical transmission system comprises at least a second optical transmitter and at least a second optical receiver, wherein a beam splitter is arranged adjacent to the pass region on the first main side, and is configured to direct an optical signal received from the pass region of the first main side to the first optical receiver disposed adjacent to the beam splitter and to direct an optical signal received from the first optical transmitter to the pass region of the first main side, wherein adjacent to the second main side, the second optical transmitter is disposed adjacent to a pass region and the second optical transmitter is disposed adjacent to a different pass region.

An aspect 31 relates to an annular structure for an optical transceiver for receiving an optical signal from an optical transmitting unit or emitting an optical signal towards an oppositely supported optical receiving unit, the optical receiver and the optical transmitter being arranged to be rotatable relative to each other and at a distance from the axis of rotation, wherein the annular structure comprises:

a first surface for beam shaping of light from an optical transmitting unit or focusing of light from the annular structure in the direction of an optical receiving unit, a second surface for beam redirection and beam shaping in order to couple, together with the first surface, a parallel beam, which is plane or inclined in the annular structure, into the annular structure, the parallel beams advantageously also being parallel to the surface and lower surface of the annular structure, or in order to redirect light from the annular structure in the direction of the first surface and, if need be, to focus it already, a number of at least one reflection element which redirect the parallel beams in the direction of a refractive surface and form the parallel beam, each reflection element being associated with a refractive surface, or in order to redirect and parallelize light coupled into the annular structure in the direction of the second surface, a plurality of at least one refractive surface which emit the light from the reflection elements towards an oppositely supported receiving unit parallel to the axis of rotation, or which focus incident light from an oppositely supported transmitting unit towards the reflection elements.

A further aspect 32 relates to an annular structure according to aspect 31, wherein the structure is designed for light within the ultraviolet, visible and/or infrared spectral region.

A further aspect 33 relates to an annular structure according to aspect 31 or 32, wherein the surfaces are formed to be planar, spherical, aspherical or freeform.

A further aspect 34 relates to an annular structure according to any of aspects 31 to 33, wherein the structure is made of optical material.

A further aspect 35 relates to an annular structure according to any of aspects 31 to 34, wherein the annular structure includes a discontinuity to preclude multiple circulations of light.

A further aspect 36 relates to an annular structure according to any of aspects 31 to 35, wherein the angular extent of the annular structure may be between a few degrees, e.g. at least 2°, at least 3°, at least 5° or at least 10°, and approximately 360° (minus only the straight or inclined slit), wherein the annular structure comprises at least one reflection element and at least one refractive surface, thereby defining the smallest angular extent possible.

A further aspect 37 relates to an annular structure according to any of aspects 31 to 36, wherein the annular structure is configured symmetrically such that the annular structure is divided into a first, e.g. right, wing and a second, e.g. left, wing, wherein the angular extent of the first and second wings is equal or unequal.

A further aspect 38 relates to an annular structure as claimed in any of aspects 31 to 37, wherein the angular extent of a symmetrical annular structure is to be treated as in claim 36, wherein each wing comprises at least one reflection element and a refractive surface.

A further aspect 39 relates to an annular structure according to any of aspects 31 to 38, wherein the reflection elements need not be arranged to be stepped but may be at one level; wherein the first and second surfaces are configured to direct the beams towards the reflection elements such that the power of the light is evenly distributed across all the reflection elements, or such that the incident light is directed by means of the first and second surfaces onto the arranged receiver through the reflection elements.

A further aspect 40 relates to an annular structure according to any of aspects 31 to 39, wherein the annular structure is arranged simultaneously as a transmitter structure and a receiver structure; wherein the arranged transmitting and receiving units are thereby arranged at the annular structure by means of an element for beam splitting.

A further aspect 41 relates to an optical transmission link comprising an annular structure in accordance with any of the previous aspects or a curved light guide structure in accordance with any of the previous claims, wherein a transmitting unit or a receiving unit is arranged at the annular structure or curved light guide structure, and at least one oppositely supported receiving unit or oppositely supported transmitting unit is arranged.

A further aspect 42 relates to an optical transmission link comprising an annular structure in accordance with any of the previous claims or a curved light guide structure in accordance with any of the previous claims, wherein for use of a partial annular structure, a plurality of oppositely supported transmitting or receiving units are arranged to enable 360° rotation; wherein the oppositely supported transmitting, receiving units are advantageously arranged to be equally distributed about the axis of rotation.

A further aspect 43 relates to a curved light guide structure configured to guide an optical signal within a spectral region, and comprising end faces disposed at two ends of the curved light guide structure; a first main side extending between the end faces, and a second main side opposite the first main side and extending between the end faces; at least a first pass region on the first main side, the first pass region being configured to receive and transmit an optical signal within the spectral region, wherein the curved light guide structure is configured to guide the optical signal along an axial direction between the end faces; and at least a second pass region on the second main side that is configured to let pass, to form and emit at least part of the optical signal from the curved light guide structure.

A further aspect 44 relates to an optical transmission system comprising an optical transmitter for transmitting an optical signal; a curved light guide structure as set forth in any of the previous aspects, configured to receive the optical signal at the first pass region; and an optical receiver for receiving at least part of the optical signal at the second pass region of the curved light guide structure.

A further aspect 45 relates to a method of manufacturing a curved light guide structure, comprising the steps of providing a curved light guide structure having end faces disposed at two ends of the curved light guide structure, a first main side extending between the end faces, and a second main side opposite the first main side and extending between the end faces, the second main side being configured to guide an optical signal within a spectral region; arranging at least a first pass region on the first main side, so that the first pass region is configured to receive and let pass an optical signal within the spectral region, so that the curved light guide structure is configured to guide the optical signal along an axial direction between the end faces; and arranging at least a second pass region on the second main side that is configured to let pass, to form and emit at least part of the optical signal from the curved light guide structure.

The terms of the first main side and/or the second main side that are used in the present description and in the patent claims may be interchanged, for example against the background of which of the main sides receives the light, that is, the optical signal, e.g. the first main side, and which provides the output signal, e.g. the second main side. In a combination, the first main side may possibly be the one having the reflection elements.

The annular structures and configurations described herein may be combined in any way with respect to the transmitting means and the receiving means, and with respect to the direction along which the optical signal is sent through the curved light guide structure. What the embodiments have in common is that in an optical transmission system, in the scope of the desired communication flow, a corresponding inlet region or outlet region is arranged, invariably or at most with the permissible interruption, in the transmitting region or receiving region of the movable part of the communication means. This may be effected by one or more curved light guide structures.

Some embodiments provide that the curved light guide structure is arranged to be stationary with respect to one of the optical receiver and/or the optical transmitter, while the other part may be movable.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A curved light guide structure configured to guide an optical signal within a spectral region, and comprising:
   end faces disposed at two ends of the curved light guide structure;
   a first main side extending between the end faces, and a second main side opposite the first main side and extending between the end faces;
   at least a first pass region on the first main side, the first pass region being configured to receive and transmit an optical signal within the spectral region, wherein the curved light guide structure is configured to guide the optical signal along an axial direction between the end faces; and
   at least a second pass region on the second main side that is configured to let pass, to form and emit at least part of the optical signal from the curved light guide structure;
   wherein the first pass region is configured to direct the optical signal to be emitted onto a first end face of the end faces, the second pass region being associated with a sub-region of the end face; and the part of the optical signal is based on a part of the optical signal that is redirected at the sub-region; wherein the first pass region is configured to direct the received optical signal to the first end face of the end faces, thereby performing focusing of the optical signal so that the optical signal redirected from the first end face is collimated; and
   wherein the curved light guide structure is configured to redirect the optical signal at one of the end faces between the axial direction and a direction oblique thereto; wherein the curved light guide structure comprises a plurality of second pass regions in the second main side, each of the second pass regions being associated with a sub-region of the end face; wherein the curved light guide structure further comprises a plurality of reflection elements arranged on the first main side in the curved light guide structure and configured to reflect a part of the optical signal, that is reflected by the associated sub-region of the end face, onto the associated second pass region; and wherein the end face is configured to redirect the optical signal in an inclined direction inclined to a course of the second main side and in a direction towards the first main side, wherein the plurality of reflection elements are arranged with increasing distance from the end face, and the different sub-regions of the end face are configured, on the basis of the inclined direction, to redirect a respectively associated spatial part of the optical signal onto a respectively associated reflection element; or
   the curved light guide structure is configured to redirect the optical signal received from the first pass region in a manner that spatially distributed between the first main side and second main side and along the axial direction and substantially parallel to the second main side, wherein the curved light guide structure comprises a plurality of reflection elements distributed along a thickness direction, each reflection element being configured to couple out a spatial part of the optical signal.

2. A curved light guide structure configured to guide an optical signal within a spectral region, and comprising:
   end faces disposed at two ends of the curved light guide structure;
   a first main side extending between the end faces, and a second main side opposite the first main side and extending between the end faces;
   at least a first pass region on the first main side, the first pass region being configured to receive and transmit an optical signal within the spectral region, wherein the curved light guide structure is configured to guide the optical signal along an axial direction between the end faces; and
   at least a second pass region on the second main side that is configured to let pass, to form and emit at least part of the optical signal from the curved light guide structure;
   wherein the first pass region is configured to direct the received optical signal to a reflection element configured to reflect the optical signal onto a sub-region of a first end face of the end faces that is associated with the reflection element; and the second pass region is configured to output the optical signal reflected by the end face;
   wherein the first pass region is configured to direct the received optical signal to the reflection element;

wherein the arrangement of the first pass region and the reflection element is arranged to transmit the optical signal to the first end face in a collimated state; and wherein the curved light guide structure is configured to redirect the optical signal at one of the end faces between the axial direction and a direction oblique thereto; wherein the curved light guide structure comprises a plurality of second pass regions in the second main side, each of the second pass regions being associated with a sub-region of the end face; wherein the curved light guide structure further comprises a plurality of reflection elements arranged on the first main side in the curved light guide structure and configured to reflect a part of the optical signal, that is reflected by the associated sub-region of the end face, onto the associated second pass region; and wherein the end face is configured to redirect the optical signal in an inclined direction inclined to a course of the second main side and in a direction towards the first main side, wherein the plurality of reflection elements are arranged with increasing distance from the end face, and the different sub-regions of the end face are configured, on the basis of the inclined direction, to redirect a respectively associated spatial part of the optical signal onto a respectively associated reflection element; or the curved light guide structure is configured to redirect the optical signal received from the first pass region in a manner that spatially distributed between the first main side and second main side and along the axial direction and substantially parallel to the second main side, wherein the curved light guide structure comprises a plurality of reflection elements distributed along a thickness direction, each reflection element being configured to couple out a spatial part of the optical signal.

3. The curved light guide structure as claimed in claim 1, wherein the end face is configured to redirect the optical signal in a direction parallel to a course of the second main side, wherein in regions of the reflection elements taper with respect to a distance between the first main side and the second main side, and the reflection elements comprise edges of a respective material taper.

4. The curved light guide structure as claimed in claim 1, wherein each reflection element is uniquely associated with a constant or variable height region of the curved light guide structure between the first and second main sides, which height region is determined via the sub-region of the end face.

5. The curved light guide structure as claimed in claim 1, wherein each of the second pass regions is configured to provide the respective part of the optical signal to a spatial region external to the curved light guide structure;

the spatial regions overlapping at a distance configured to a communications receiver;

wherein each of the second pass regions is configured to provide the respective part of the optical signal, in a collimated state, to a spatial region outside the curved light guide structure.

6. The curved light guide structure as claimed in claim 1, wherein the first pass region is arranged adjacent to an end face.

7. The curved light guide structure as claimed in claim 1, configured to redirect the optical signal via a reflection element towards one of the end faces between the axial direction and a direction oblique thereto; wherein the curved light guide structure comprises a plurality of first pass regions in the first main side, each first pass region being associated with a sub-region of the end face.

8. The curved light guide structure as claimed in claim 7, wherein the first pass regions are disposed such that a distance between the first pass regions is arranged such that the distance corresponds at most to the spatial extent of the optical signal.

9. The curved light guide structure as claimed in claim 7, wherein each reflection element is associated with a sub-region of the end face; and a reflection element is associated with each of the first pass regions.

10. The curved light guide structure as claimed in claim 7, wherein the second pass region is disposed adjacent to an end face.

11. The curved light guide structure as claimed in claim 1, the shape of which describes an elliptical ring segment.

12. The curved light guide structure as claimed in claim 1, the shape of which describes a circular ring segment.

13. The curved light guide structure as claimed in claim 1, the curvature of which comprises an aperture angle $\beta$ of at least 5° and less than 360° with respect to a circumferentially closed path.

14. The curved light guide structure as claimed in claim 1, wherein the first and/or second pass region comprises a surface which is convexly curved, spherical, aspherically curved or is a free form.

15. The curved light guide structure as claimed in claim 1, which provides a first segment of an overall structure and which comprises a second segment of equal or different size, the end faces of the two segments being arranged adjacent to each other in a center region, the first pass region or the second pass region being arranged in the center region.

16. The curved light guide structure as claimed in claim 1, wherein the first pass region and the second pass region are bidirectionally transparent to the spectral region.

17. An optical transmission system comprising:
an optical transmitter for transmitting an optical signal;
a curved light guide structure,
wherein the curved light guide structure is configured to guide an optical signal within a spectral region, and comprises: end faces disposed at two ends of the curved light guide structure; a first main side extending between the end faces, and a second main side opposite the first main side and extending between the end faces; at least a first pass region on the first main side, the first pass region being configured to receive and transmit an optical signal within the spectral region, wherein the curved light guide structure is configured to guide the optical signal along an axial direction between the end faces; and at least a second pass region on the second main side that is configured to let pass, to form and emit at least part of the optical signal from the curved light guide structure; wherein the first pass region is configured to direct the optical signal to be emitted onto a first end face of the end faces, the second pass region being associated with a sub-region of the end face; and the part of the optical signal is based on a part of the optical signal that is redirected at the sub-region; wherein the first pass region is configured to direct the received optical signal to the first end face of the end faces, thereby performing focusing of the optical signal so that the optical signal redirected from the first end face is collimated; or
wherein the curved light guide structure and comprises:
end faces disposed at two ends of the curved light guide structure; a first main side extending between the end faces, and a second main side opposite the first main side and extending between the end faces; at least a first pass region on the first main side, the first pass region being configured to receive and transmit an optical signal within the spectral region, wherein the curved light guide structure is configured to guide the optical signal along an axial direction between the end faces; and at least a second pass region on the second main side that is configured to let pass, to form and emit at least part of the optical signal from the curved light guide structure; wherein the first pass region is configured to direct the received optical signal to a reflection element configured to reflect the optical signal onto a sub-region of a first end face of the end faces that is associated with the reflection element; and the second pass region is configured to output the optical signal reflected by the end face; wherein the first pass region is configured to direct the received optical signal to the reflection element; wherein the arrangement of the first pass region and the reflection element is arranged to transmit the optical signal to the first end face in a collimated state;

wherein the curved light guide structure is configured to receive the optical signal at the first pass region; and an optical receiver for receiving at least part of the optical signal at the second pass region of the curved light guide structure;

wherein a plurality of second pass regions are arranged on the second main side and are configured to each output a portion of the optical signal, wherein at a location of the optical receiver, every other pass region provides the part of the optical signal into a spatial region outside the curved light guide structure; wherein the spatial regions overlap at the location of the optical receiver such that upon a relative movement of the optical receiver with respect to the second pass regions, at least one second pass region is positioned with the optical receiver for optical communication; and/or wherein a plurality of first pass regions are arranged on the first main side, each configured to receive the optical signal, the optical transmitter being configured such that, at a location of the curved light guide structure, the optical signal impinges on the curved light guide structure in a spatial region, the spatial region being larger, along the extension of the curved light guide structure, than a respective first pass region; wherein the first pass regions are spaced apart from each other with a distance between them that is selected such that upon a relative movement of the optical transmitter with respect to the first pass regions, at least one respective first pass region is positioned with the optical transmitter for optical communication; or wherein a plurality of pass regions are arranged on the second main side, and at least one pass region is arranged on the first main side;

wherein the optical transmitter is a first optical transmitter, wherein the optical receiver is a first optical receiver; wherein the optical transmission system comprises at least a second optical transmitter and at least a second optical receiver, wherein a beam splitter is arranged adjacent to the pass region on the first main side and is configured to direct an optical signal received from the pass region of the first main side to the first optical receiver arranged adjacent to the beam splitter, and to direct an optical signal received from the first optical transmitter to the pass region of the first main side, wherein adjacent to the second main side, the second optical transmitter is arranged adjacent to a pass region and the second optical receiver is arranged adjacent to a pass region different therefrom.

18. The optical transmission system as claimed in claim 17, wherein the optical transmitter and the optical receiver are arranged to be movable relative to each other so as to perform a relative rotational movement about a shared axis of rotation.

19. The optical transmission system as claimed in claim 18, wherein the curved light guide structure is stationary with respect to one of the optical receiver and the optical transmitter.

20. The optical transmission system as claimed in claim 17.

21. The optical transmission system as claimed in claim 17, wherein the optical receiver is a first optical receiver, wherein the optical transmitter is fixedly connected to the curved light guide structure, in which the curved light guide structure describes a sub-region of a circumferential path, and the optical transmission system comprises at least one second optical receiver, so that at each relative position, at least one optical receiver is arranged, with respect to the curved optical waveguide structure, in such a way as to receive part of the optical signal.

22. The optical transmission system as claimed in claim 21, wherein the curved light guide structure is formed symmetrically about a center region and toward the end faces, the first pass region is disposed in the center region, and the optical transmitter is arranged to be stationary with respect to the center region; or wherein the second pass region is disposed in the center region, and the optical receiver is arranged to be stationary with respect to the center region.

23. The optical transmission system as claimed in claim 17, wherein the optical transmitter is a first optical transmitter, wherein the optical receiver is connected to the curved light guide structure in a stationary manner, in which the curved light guide structure describes a sub-region of a circumferential path, and the optical transmission system comprises at least one second optical transmitter, so that at each relative position, at least one optical transmitter is arranged, with respect to the curved light guide structure, in such a way as to transmit the optical signal to the curved light guide structure.

24. The optical transmission system as claimed in claim 17.

* * * * *

UNITED STATES PATENT AND TRADEMARK OFFICE
CERTIFICATE OF CORRECTION

PATENT NO. : 12,166,529 B2
APPLICATION NO. : 17/477881
DATED : December 10, 2024
INVENTOR(S) : Tobias Schneider It is certified that error appears in the above-identified patent and that said Letters Patent is hereby corrected as shown below:

In the Claims

Claim 20, Column 26 Line 23 after "The optical transmission system as claimed in claim 17", please insert --wherein a plurality of second pass regions are arranged on the second main side and are configured to each output a portion of the optical signal, wherein at a location of the optical receiver, every other pass region provides the part of the optical signal into a spatial region outside the curved light guide structure; wherein the spatial regions overlap at the location of the optical receiver such that upon a relative movement of the optical receiver with respect to the second pass regions, at least one second pass region is positioned with the optical receiver for optical communication; and/or wherein a plurality of first pass regions are arranged on the first main side, each configured to receive the optical signal, the optical transmitter being configured such that, at a location of the curved light guide structure, the optical signal impinges on the curved light guide structure in a spatial region, the spatial region being larger, along the extension of the curved light guide structure, than a respective first pass region; wherein the first pass regions are spaced apart from each other with a distance between them that is selected such that upon a relative movement of the optical transmitter with respect to the first pass regions, at least one respective first pass region is positioned with the optical transmitter for optical communication--

Claim 24, Column 26 Line 54 after "The optical transmission system as claimed in claim 17", please insert --wherein a plurality of pass regions are arranged on the second main side, and at least one pass region is arranged on the first main side;
wherein the optical transmitter is a first optical transmitter, wherein the optical receiver is a first optical receiver;
wherein the optical transmission system comprises at least a second optical transmitter and at least a second optical receiver, wherein a beam splitter is arranged adjacent to the pass region on the first main side and is configured to direct an optical signal received from the pass region of the first main side to the first optical receiver arranged adjacent to the beam splitter, and to direct an optical signal received from the first optical transmitter to the pass region of the first main side, wherein adjacent to the second main side, the second optical transmitter is arranged adjacent to a pass region and the second optical receiver is arranged adjacent to a pass region different therefrom--

Signed and Sealed this
First Day of April, 2025

Coke Morgan Stewart
*Acting Director of the United States Patent and Trademark Office*